US012374291B2

(12) United States Patent
Park et al.

(10) Patent No.: US 12,374,291 B2
(45) Date of Patent: Jul. 29, 2025

(54) DISPLAY DEVICE AND DRIVING METHOD

(71) Applicant: LG Display Co., Ltd., Seoul (KR)

(72) Inventors: YongKyu Park, Gyeonggi-do (KR); JaeKook Ahn, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/584,233

(22) Filed: Feb. 22, 2024

(65) Prior Publication Data

US 2024/0290266 A1 Aug. 29, 2024

(30) Foreign Application Priority Data

Feb. 28, 2023 (KR) ........................ 10-2023-0026813

(51) Int. Cl.
*G09G 3/32* (2016.01)
*G09G 3/3233* (2016.01)

(52) U.S. Cl.
CPC ............ *G09G 3/3233* (2013.01); *G09G 3/32* (2013.01); *G09G 2300/0439* (2013.01); *G09G 2310/0243* (2013.01); *G09G 2310/0291* (2013.01); *G09G 2310/061* (2013.01); *G09G 2310/08* (2013.01)

(58) Field of Classification Search
CPC ................... G09G 3/3233; G09G 3/32; G09G 2310/0291; G09G 2310/061; G09G 2310/0243; G09G 2310/08
See application file for complete search history.

(56) References Cited

U.S. PATENT DOCUMENTS 8,686,982 B2 * 4/2014 Ryu ..................... G09G 3/3233 345/82
11,151,957 B2 * 10/2021 Shimizu ............... G09G 3/3696
2011/0012819 A1 * 1/2011 Ryu ..................... G09G 3/3233 345/82
2016/0307490 A1 10/2016 Lee et al.
2021/0118398 A1 * 4/2021 Shimizu ............... G09G 3/3696
2021/0295767 A1 * 9/2021 Seo ...................... G09G 3/2003
2022/0148501 A1 * 5/2022 Pyun .................... G09G 3/3233
2023/0092609 A1 * 3/2023 Lee ...................... G09G 3/2092

FOREIGN PATENT DOCUMENTS

KR 10-2014-0082499 A 7/2014

OTHER PUBLICATIONS

Office Action issued on Jul. 11, 2024 for counterpart U.K. Patent Application No. GB2400464.0.

* cited by examiner

*Primary Examiner* — Olga V Merkoulova
(74) *Attorney, Agent, or Firm* — Morgan, Lewis & Bockius LLP

(57) ABSTRACT

Embodiments of the disclosure relate to a display device and a method for driving the same and, specifically, may stably supply current to the driving voltage line by controlling the output current by the first gain when the difference in magnitude between the sensing current and the target current is larger than the reference data and controlling the output current by the second gain when the difference in magnitude between the sensing current and the target current is the reference data or less.

20 Claims, 28 Drawing Sheets

DISPLAY DEVICE AND DRIVING METHOD

CROSS-REFERENCE TO RELATED APPLICATION

This application claims priority from Korean Patent Application No. 10-2023-0026813, filed on Feb. 28, 2023, which is hereby incorporated by reference for all purposes as if fully set forth herein.

BACKGROUND

Field

Embodiments of the present disclosure relate to a display device and a driving method.

Description of Related Art

Among display devices currently being developed, there are self-emission display devices with subpixels including light emitting elements disposed in the display panel. Each subpixel disposed in the display panel of the self-emission display device may include a self-emission light emitting element and a driving transistor for driving the light emitting element.

When the display panel is driven, an output current may be supplied to the display panel through a driving voltage line to which a driving voltage is supplied.

SUMMARY

If the output current is unstably supplied to the display panel, flicker may occur in the display panel.

Accordingly, embodiments of the present disclosure may provide a display device and a method for driving the display device that may stably supply current to the driving voltage line.

Accordingly, embodiments of the present disclosure may provide a display device and a method for driving the display device that may prevent flicker.

Accordingly, embodiments of the present disclosure may provide a display device and a method for driving the display device that enable low power consumption by preventing flicker.

Embodiments of the disclosure may provide a display device comprising a display panel having a plurality of subpixels receiving a driving voltage through a driving voltage line and displaying a plurality of image frames, a controller controlling a voltage and current supplied to the display panel, and a current sensing circuit sensing an output current supplied to the display panel through the driving voltage line and supplying a sensing current corresponding to the output current to the controller, wherein the controller controls the output current by comparing the sensing current and a target current, controls the output current flowing through the driving voltage line by a first gain when a difference in magnitude between the sensing current and the target current is larger than reference data, and controls the output current flowing through the driving voltage line by a second gain when the difference in magnitude between the sensing current and the target current is the reference data or less.

Embodiments of the disclosure may provide a method for driving a display device, comprising a current sensing step in which a current sensing circuit senses an output current supplied to a display panel through a driving voltage line and supplies a sensing current corresponding to the output current to a controller, an output current determination step in which the controller compares the sensing current and a target current, a filter determination step in which when a difference in magnitude between the sensing current and the target current is larger than reference data, the controller selects a fast filter mode to control the output current and, when the difference in magnitude between the sensing current and the target current is the reference data or less, the controller selects a slow filter mode to control the output current, and an output current change step in which when the fast filter mode is selected, the controller controls the output current flowing through the driving voltage line by a first gain and, when the slow filter mode is selected, the controller controls the output current flowing through the driving voltage line by a second gain.

According to embodiments of the present disclosure, there may be provided a display device and a method for driving the display device that may stably supply current to the driving voltage line.

According to embodiments of the disclosure, there may be provided a display device and a method for driving the display device that may prevent flicker.

According to embodiments of the disclosure, there may be provided a display device and a method for driving the display device that enable low power consumption by preventing flicker.

It is to be understood that both the foregoing general description and the following detailed description of the present disclosure are by way of example and are intended to provide further explanation of the disclosures.

BRIEF DESCRIPTION OF DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
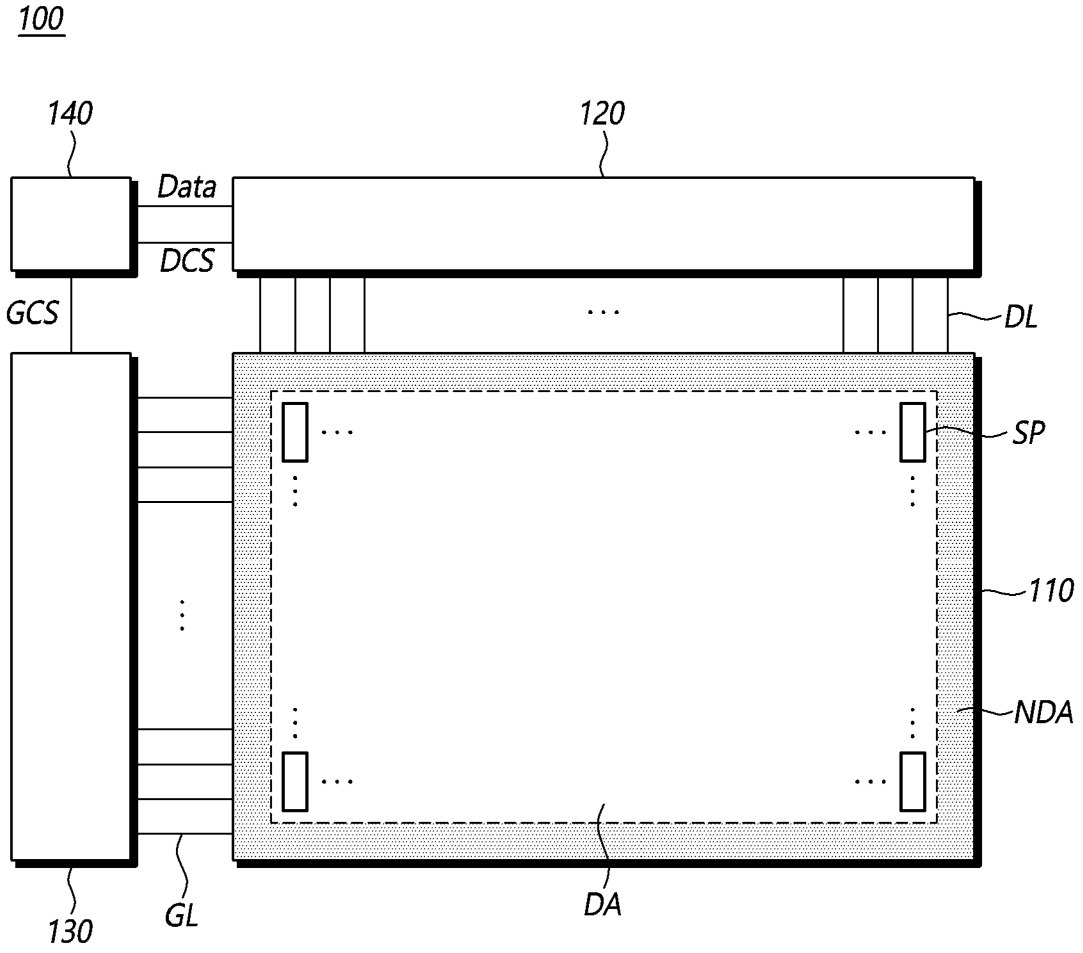
FIG. 1 is a view illustrating a system configuration of a display device according to example embodiments of the disclosure.

Reference will now be made in detail to embodiments of the present disclosure, examples of which are illustrated in the accompanying drawings.

Advantages and features of the present disclosure, and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete, and will fully convey the scope of the present disclosure to those skilled in the art.

The same reference numerals and signs generally denote the same or like elements throughout the specification and drawings, unless otherwise specified.

In the following description, where a detailed description of a relevant known function or configuration may unnecessarily obscure aspects of the present disclosure, a detailed description of such a known known function or configuration may be omitted or only a brief description may be provided.

Where a term like "comprise," "have," "include," "contain," "constitute," "made up of," or "formed of" is used, one or more other elements may be added unless a more limiting term, such as "only" or the like, is used. An element described in the singular form is intended to include a plurality of elements, and vice versa, unless the context clearly indicates otherwise.

Although the terms "first," "second," "A," "B," "(A)," "(B)," and the like may be used herein to describe various elements, these elements should not be interpreted to be limited by these terms as they are not used to define a particular essence, order, sequence, precedence, or number of such elements or to otherwise limit the elements. These terms are used merely to refer to one element separately from another element. For example, a first element could be termed a second element, and a second element could similarly be termed a first element, without departing from the scope of the present disclosure.

Where an expression that an element or layer "is connected to," "is coupled to," "is adhered to," "contacts," or "overlaps" another element or layer is used, the element or layer not only can be directly connected, coupled, or adhered to or directly contact or overlap another element or layer, but also can be indirectly connected, coupled, or adhered or indirectly contact or overlap another element or layer with one or more intervening elements or layers "disposed" or "interposed" between the elements or layers, unless otherwise specified.

Where a temporal relationship between processes, operations, flows, steps, events, or the like is described as, for example, "after," "subsequent," "next," or "before," the relationship encompasses not only a continuous or sequential order but also a non-continuous, non-consecutive, or non-sequential relationship unless a more limiting term, such as "just," "immediate(ly)," or "direct(ly)," is used.

In addition, where any dimensions, relative sizes, and the like are discussed, numerical values for an elements or features, or corresponding information (e.g., level, range, etc.) should be considered to include a tolerance or error range that may be caused by various factors (e.g., process factors, internal or external impact, noise, etc.) even where no explicit description of such a tolerance or error range is provided. Further, the term "may" fully encompasses all the meanings of the term "can."

Hereinafter, various example embodiments of the present disclosure are described in detail with reference to the accompanying drawings.

FIG. 1 is a view illustrating a system configuration of a display device 100 according to example embodiments of the disclosure.

As shown in FIG. 1, according to example embodiments of the disclosure, a display device 100 may include a display panel 110 and driving circuits for driving the display panel 110.

The display panel 110 may include signal lines, such as a plurality of data lines DL and a plurality of gate lines GL, and may include a plurality of sub-pixels SP. The display panel 110 may include a display area DA configured to display images and a non-display area NDA in which no image is displayed. In the display panel 110, a plurality of subpixels SP for displaying images may be disposed in the display area DA, and the driving circuits 120, 130, and 140 may be electrically connected or disposed in the non-display area NDA. Further, pad units for connection of integrated circuits or a printed circuit may be disposed in the non-display area NDA.

The driving circuits may include a data driving circuit 120 and a gate driving circuit 130. The display device 100 may further include a controller 140 for controlling the data driving circuit 120 and the gate driving circuit 130.

The data driving circuit 120 is a circuit for driving the plurality of data lines DL and may supply data signals to the plurality of data lines DL. The gate driving circuit 130 is a circuit for driving the plurality of gate lines GL and may supply gate signals to the plurality of gate lines GL.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying gate signals of the turn-on level voltage to the plurality of gate lines GL.

The controller 140 may supply a data control signal DCS to the data driving circuit 120 to control the operation timing of the data driving circuit 120. The controller 140 may supply a gate control signal GCS for controlling the operation timing of the gate driving circuit 130 to the gate driving circuit 130.

The controller 140 may start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

To control the data driving circuit 120 and the gate driving circuit 130, the controller 140 may receive timing signals, such as the vertical synchronization signal Vsync, horizontal synchronization signal Hsync, input data enable signal DE, and clock signal CLK, may generate various control signals, such as DCS and GCS, and may output the control signals respectively to the data driving circuit 120 and the gate driving circuit 130.

The controller 140 may be implemented as a separate component from the data driving circuit 120, or the controller 140 and the data driving circuit 120 may be implemented as an integrated circuit.

The data driving circuit 120 may receive the image data Data from the controller 140 and may supply data voltages to the plurality of data lines DL, thereby driving the plurality of data lines DL. The data driving circuit 120 may also referred to as a "source driving circuit. The data driving circuit 120 may include one or more source driver integrated circuit (SDICs). Each source driver integrated circuit (SDIC) may include a shift register, a latch circuit, a digital-to-analog converter (DAC), and an output buffer. In some cases, each source driver integrated circuit (SDIC) may further include an analog-digital converter ADC.

For example, each source driver integrated circuit (SDIC) may be connected with the display panel 110 by a tape automated bonding (TAB) method, may be connected to a bonding pad of the display panel 110 by a chip on glass (COG) or chip on panel (COP) method, or may be implemented by a chip on film (COF) method and connected with the display panel 110.

The gate driving circuit 130 may be connected with the display panel 110 by a TAB method, or may be connected to a bonding pad of the display panel 110 by a COG or COP method, or may be connected with the display panel 110 according to a COF method. Alternatively, the gate driving circuit 130 may be formed in the non-display area NDA of the display panel 110 in a gate in panel (GIP) type.

When a specific gate line GL is opened by the gate driving circuit 130, the data driving circuit 120 may convert the image data Data received from the controller 140 into an analog data voltage and supply the analog data voltage to the plurality of data lines DL.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The controller 140 may be a timing controller used in typical display technology, a control device that performs other control functions as well as the functions of a timing controller, or a control device other than a timing controller 140, or may be a circuit within a larger control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit. The controller 140 may transmit/receive signals to/from the data driving circuit 120 according to one or more predetermined interfaces. The interface may include, e.g., a low voltage differential signaling (LVDS) interface, an embedded panel interface (EPI), and a serial peripheral interface (SPI). The controller 140 may include storage, such as one or more registers.

According to an example embodiment, the display device 100 may be a self-emission display, such as an organic light emitting diode (OLED) display, a quantum dot display, or a micro light emitting diode (LED) display.

Figure 2:
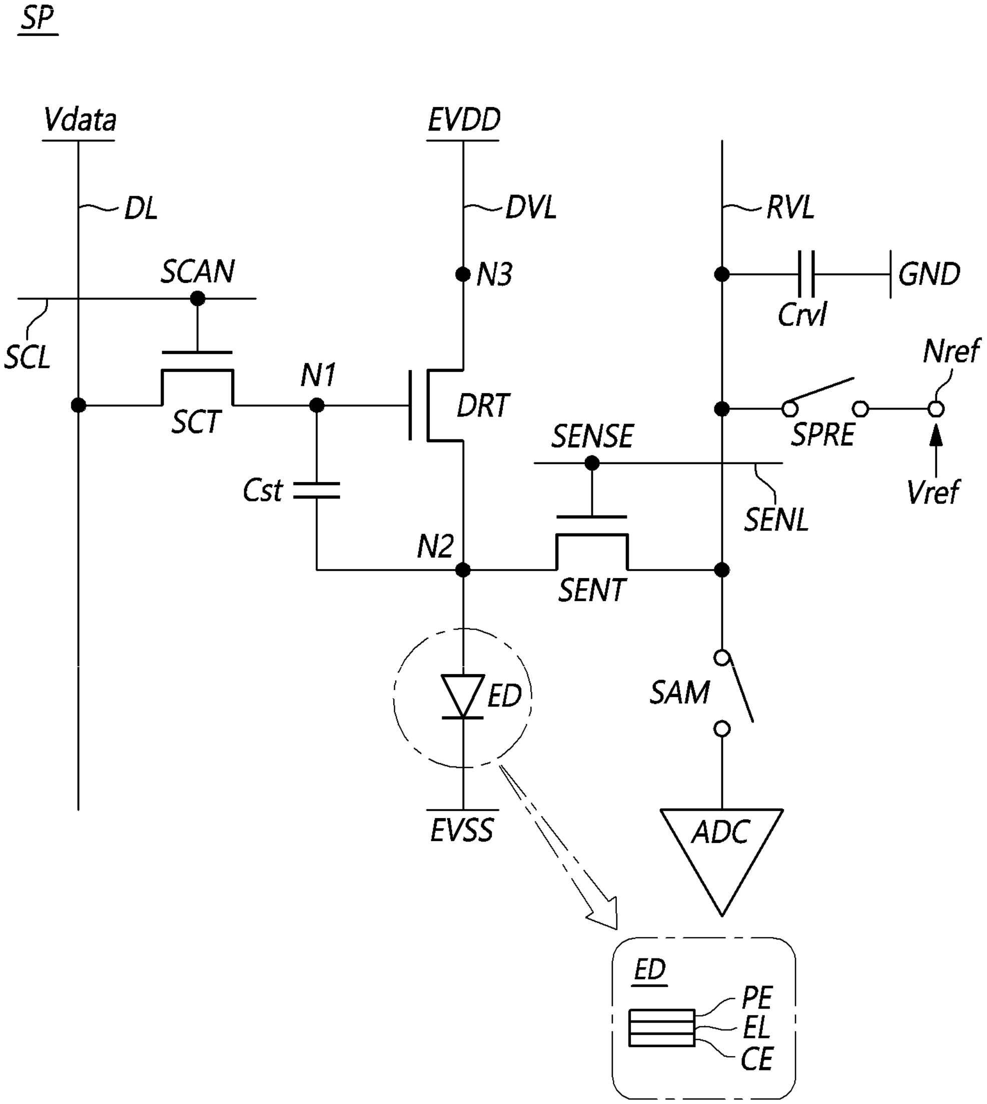
FIG. 2 is an equivalent circuit diagram illustrating a subpixel of a display device according to example embodiments of the disclosure.

FIG. 2 is an equivalent circuit diagram illustrating a subpixel SP of a display device 100 according to example embodiments of the disclosure.

As illustrated in FIG. 2, each of a plurality of subpixels SP disposed on a display panel 110 of a display device 100 according to example embodiments of the disclosure may include a light emitting element ED, a driving transistor DRT, a scan transistor SCT, a sensing transistor SENT, and a storage capacitor Cst. If the subpixel SP includes the three transistors DRT, SCT, and SENT and one capacitor Cst, the subpixel SP may be referred to as having a 3T (Transistor) 1C (Capacitor) structure.

The light emitting element ED may include a pixel electrode PE and a common electrode CE, and a light emitting layer EL positioned between the pixel electrode PE and the common electrode CE. Here, the pixel electrode PE may be disposed in each subpixel SP, and the common electrode CE may be commonly disposed in multiple subpixels SP. For example, the pixel electrode PE may be an anode electrode, and the common electrode CE may be a cathode electrode. As another example, the pixel electrode PE may be a cathode electrode, and the common electrode CE may be an anode electrode. For example, the light emitting element ED may be an organic light emitting diode OLED, a micro light emitting diode (micro LED), or a quantum dot light emitting element ED. As the light emitting element ED emits light, an image frame may be represented.

The driving transistor DRT is a transistor for driving the light emitting element ED, and may include a first node N1, a second node N2, and a third node N3.

The first node N1 of the driving transistor DRT may be a gate node of the driving transistor DRT and may be electrically connected with a source node or a drain node of the scan transistor SCT. The second node N2 of the driving transistor DRT may be a source node or a drain node of the driving transistor DRT, and may be electrically connected with a source node or a drain node of the sensing transistor SENT and may also be electrically connected with the pixel electrode PE of the light emitting element ED. The third node N3 of the driving transistor DRT may be electrically connected with a driving voltage line DVL supplying a driving voltage EVDD. The driving transistor DRT may be electrically connected between a driving voltage line DVL and the light emitting element ED.

The scan transistor SCT may be controlled by the scan signal SCAN and may be connected between the first node N1 of the driving transistor DRT and the data line DL. The scan transistor SCT may be turned on or off according to the scan signal SCAN supplied from the scan signal line SCL, which is a type of the gate line GL, controlling the connection between the data line DL and the first node N1 of the driving transistor DRT.

The scan transistor SCT may be turned on by the scan signal SCAN having a turn-on level voltage and transfer the data voltage Vdata supplied from the data line DL to the first node N1 of the driving transistor DRT.

The turn-on level voltage of the scan signal SCAN that may turn on the scan transistor SCT may be a high-level voltage or a low-level voltage. The turn-off level voltage of the scan signal SCAN that may turn off the scan transistor SCT may be a low-level voltage or a high-level voltage. For example, where the scan transistor SCT is an n-type transistor, the turn-on level voltage may be a high-level voltage, and the turn-off level voltage may be a low-level voltage. As another example, where the scan transistor SCT is a p-type transistor, the turn-on level voltage may be a low-level voltage, and the turn-off level voltage may be a high-level voltage.

The sensing transistor SENT may be controlled by a sense signal SENSE and may be connected between the second node N2 of the driving transistor DRT and the reference voltage line RVL. The sensing transistor SENT may be turned on or off according to the sense signal SENSE supplied from the sense signal line SENL, which is another type of the gate line GL, controlling the connection between the reference voltage line RVL and the second node N2 of the driving transistor DRT.

The sensing transistor SENT may be turned on by the sense signal SENSE having a turn-on level voltage and transfer a reference voltage Vref supplied from the reference voltage line RVL to the second node N2 of the driving transistor DRT.

The turn-on level voltage of the sense signal SENSE that may turn on the sensing transistor SENT may be a high-level voltage or a low-level voltage. The turn-off level voltage of the sense signal SENSE that may turn off the sensing transistor SENT may be a low-level voltage or a high-level voltage. For example, where the sensing transistor SENT is an n-type transistor, the turn-on level voltage may be a high-level voltage, and the turn-off level voltage may be a low-level voltage. As another example, where the sensing transistor SENT is a p-type transistor, the turn-on level voltage may be a low-level voltage, and the turn-off level voltage may be a high-level voltage.

Meanwhile, the display device 100 may further include a line capacitor Crvl formed between the reference voltage line RVL and the ground GND, a sampling switch SAM for controlling the connection between the reference voltage line RVL and the analog-to-digital converter ADC, and a power switch SPRE for controlling the connection between the reference voltage line RVL and the reference voltage supply node Nref. The reference voltage Vref output from the power supply device 500 (see, e.g., FIG. 5) may be supplied to the reference voltage supply node Nref and may be applied to the reference voltage line RVL through the power switch SPRE.

The sensing transistor SENT may be turned on by the sense signal SENSE having a turn-on level voltage, transferring the voltage V2 of the second node N2 of the driving transistor DRT to the reference voltage line RVL. Accordingly, a line capacitor Crvl formed between the reference voltage line RVL and the ground GND may be charged.

The function in which the sensing transistor SENT transfers the voltage V2 of the second node N2 of the driving transistor DRT to the reference voltage line RVL may be used upon driving to sense the characteristic value of the subpixel SP. In this case, the voltage transferred to the reference voltage line RVL may be a voltage for calculating a characteristic value of the subpixel SP or a voltage reflecting the characteristic value of the subpixel SP.

In the present disclosure, the characteristic value of the subpixel SP may be a characteristic value of the driving transistor DRT or the light emitting element ED. The characteristic value of the driving transistor DRT may include a threshold voltage and mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor or a p-type transistor. In the present disclosure, for convenience of description, each of the driving transistor DRT, the scan transistor SCT, and the sensing transistor SENT is an n-type transistor, but the disclosure is not limited thereto.

The storage capacitor Cst may be electrically connected between the first node N1 and second node N2 of the driving transistor DRT. The storage capacitor Cst may be charged with the quantity of electric charge corresponding to the voltage difference between the first node N1 and the second node N2 and may serve to maintain the voltage difference between the nodes N1 and N2 for a predetermined frame time. Accordingly, during the predetermined frame time, the corresponding subpixel SP may emit light.

The storage capacitor Cst is not a parasitic capacitor (e.g., Cgs or Cgd) which is an internal capacitor existing between the gate node and the source node (or drain node) of the driving transistor DRT. Rather, the storage capacitor Cst may be an external capacitor intentionally designed outside the driving transistor DRT.

The scan signal line SCL and the sense signal line SENL may be different gate lines GL. In this case, the scan signal SCAN and the sense signal SENSE may be separate gate signals, and the on-off timings of the scan transistor SCT and the on-off timings of the sense transistor SENT in one subpixel SP may be independent from each other. In other words, the on-off timings of the scan transistor SCT and the on-off timings of the sensing transistor SENT in one subpixel SP may be the same or different.

Alternatively, the scan signal line SCL and the sense signal line SENL may be the same gate line GL. In other words, the gate node of the scan transistor SCT and the gate node of the sensing transistor SENT in one subpixel SP may be connected with one gate line GL. In this case, the scan signal SCAN and the sense signal SENSE may be the same gate signal, and the on-off timings of the scan transistor SCT and the on-off timings of the sense transistor SENT in one subpixel SP may be the same.

Meanwhile, the reference voltage line RVL may be disposed for each subpixel (SP) column. Alternatively, the reference voltage line RVL may be disposed for every two or more subpixel (SP) columns. Where the reference voltage line RVL is disposed for every two or more subpixel (SP) columns, the plurality of subpixels SP may receive the reference voltage Vref from one reference voltage line RVL.

Figure 3:
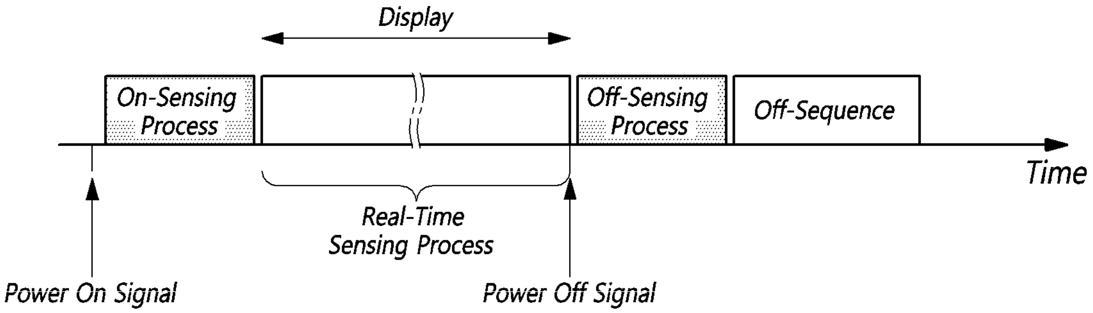
FIG. 3 is a view illustrating various sensing timings of a display device according to example embodiments of the disclosure.
Figure 4:
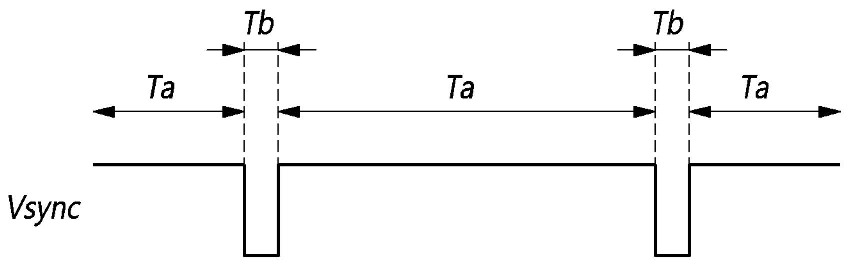
FIG. 4 is a view illustrating a vertical sync signal of a display device according to example embodiments of the disclosure.

FIG. 3 is a view illustrating various sensing timings of a display device 100 according to example embodiments of the disclosure. FIG. 4 is a view illustrating a vertical sync signal Vsync of a display device 100 according to example embodiments of the disclosure.

As illustrated in FIG. 3, the display device 100 according to example embodiments of the disclosure may sense the characteristic value of the driving transistor DRT in each subpixel SP disposed in the display panel 110 if a power on signal is generated. Such a sensing process may be referred to as an on-sensing process.

Further, the display device 100 may sense the characteristic value of the driving transistor DRT in each subpixel SP disposed in the display panel 110 before an off sequence, such as power off, proceeds if a power off signal is generated. Such a sensing process may be referred to as an off-sensing process.

Further, the characteristic value of the driving transistor DRT in each subpixel SP may be sensed during display driving until a power off signal is generated after a power on signal is generated. Such a sensing process may be referred to as a "real-time sensing process."

As shown in FIG. 4, a vertical sync signal Vsync is a control signal for defining a frame and may repeatedly include a signal section defining an active period Ta and a signal section defining a blank period Tb. The active period Ta may be a period during which substantial display driving for updating an image is performed, and the blank period Tb may be a rest period during which substantial display driving is not performed.

For example, the signal section defining the active period Ta may be a high-level voltage section, and the signal section defining the blank period Tb may be a low-level voltage section. As another example, the signal section defining the active period Ta may be a low-level voltage section, and the signal section defining the blank period Tb may be a high-level voltage section.

As illustrated in FIG. 4, one image driving period may include one active period Ta and one blank period Tb. In other words, the active period Ta, which is a period during which each of the plurality of image frames is displayed through the display panel 110, and the blank period Tb, which is a period different from the active period Ta, may be included in the image driving period.

The above-described real-time sensing process may be performed in every blank period Tb between the active periods Ta with respect to the vertical sync signal Vsync.

Figure 5:
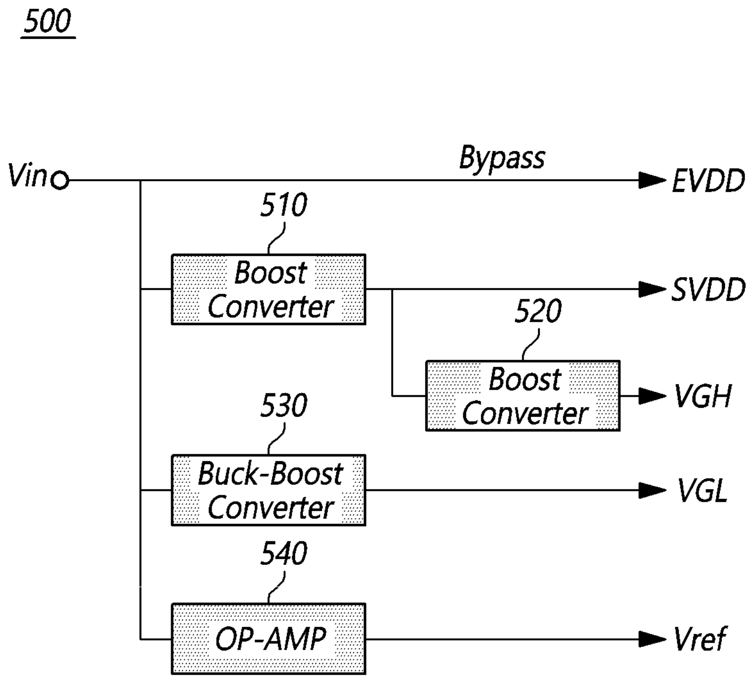
FIG. 5 is a view illustrating a power supply device according to example embodiments of the disclosure.

FIG. 5 is a view illustrating a power supply device 500 according to example embodiments of the disclosure.

After receiving an input voltage Vin, the power supply device 500 may output a voltage based on the input voltage Vin. For example, with reference to FIG. 5, the voltages output from the power supply device 500 may include a driving voltage EVDD, a source voltage SVDD, a gate high voltage VGH, a gate low voltage VGL, a reference voltage Vref, and the like.

The power supply device 500 may include circuits for changing the magnitude of the input voltage Vin. For example, as illustrated in FIG. 5, the power supply device 500 may include boost converters 510 and 520, a buck boost converter 530, and an operational amplifier 540.

The boost converters 510 and 520 may be types of DC-DC converters, and the boost converters 510 and 520 may boost and output the respective input voltages.

The buck boost converter 530 may be a type of DC-DC converter, and the buck boost converter 530 may drop or boost the input voltage and output the input voltage.

The operational amplifier 540 may be configured in the form of a non-inverting amplifier circuit or an inverting amplifier, and the operational amplifier 540 may change the magnitude of the input voltage and output the input voltage.

The power supply device 500 may output the driving voltage EVDD based on the input voltage Vin. The input voltage Vin may be bypassed, and the magnitude of the driving voltage EVDD may be the same as the magnitude of the input voltage Vin.

The power supply device 500 may output the source voltage SVDD based on the input voltage Vin. The input voltage Vin may be supplied to the first boost converter 510 and then changed to the source voltage SVDD that is then output.

The power supply device 500 may output the gate high voltage VGH based on the input voltage Vin. The input voltage Vin may be supplied to the first boost converter 510 and then to the second boost converter 520. The voltage output from the second boost converter 520 may be the gate high voltage VGH.

The power supply device 500 may output the gate low voltage VGL based on the input voltage Vin. The input voltage Vin may be supplied to the buck boost converter 530 and then changed to the gate low voltage VGL that is then output.

The power supply device 500 may output the reference voltage Vref based on the input voltage Vin. The input voltage Vin may be supplied to the operational amplifier 540 and then changed to the reference voltage Vref that is then output.

Figure 6:
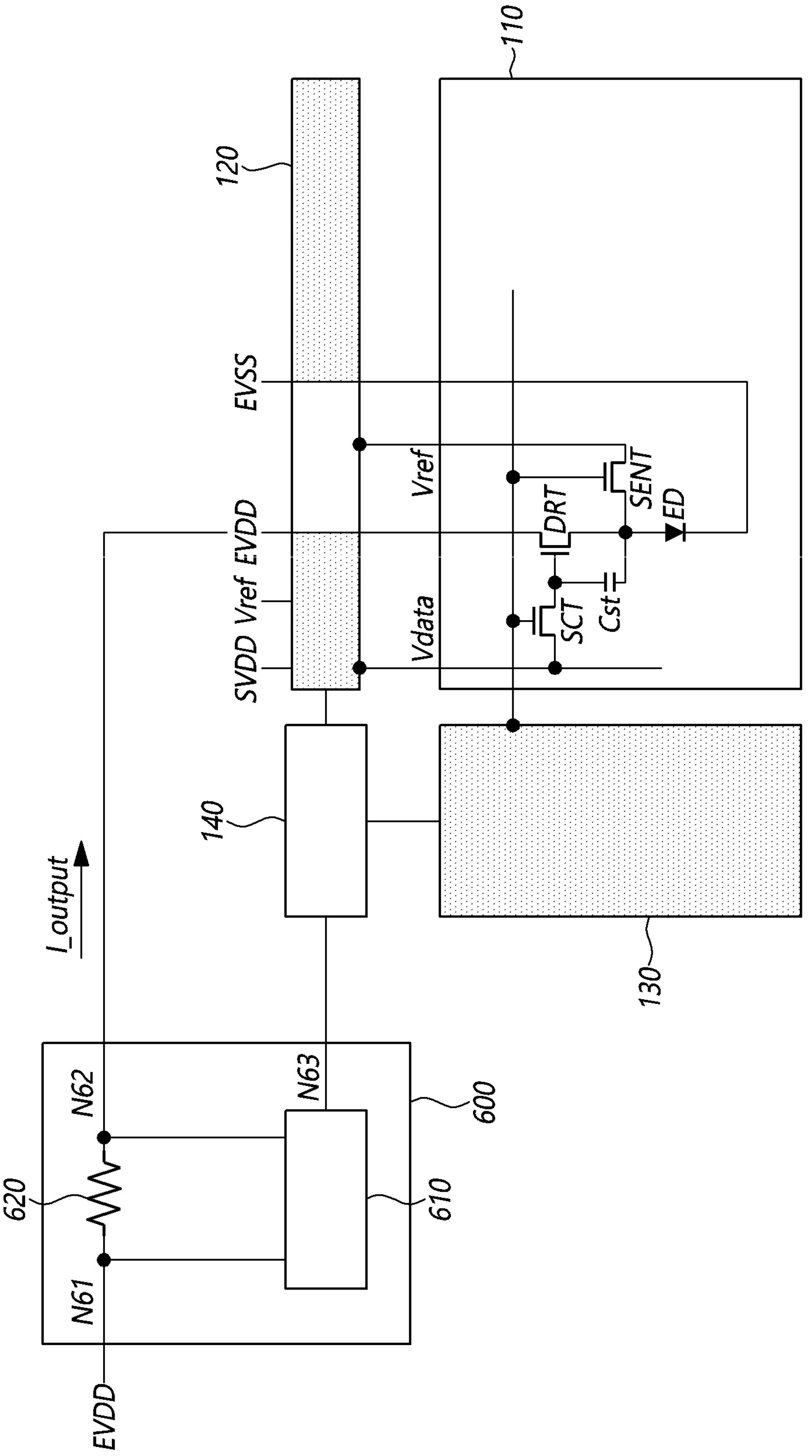
FIG. 6 is a view illustrating a method for measuring an output current according to example embodiments of the disclosure.

FIG. 6 is a view illustrating a method for measuring an output current I_output according to example embodiments of the disclosure.

For image driving, the driving voltage EVDD may be supplied to the display panel 110. An output current I_output may flow to the line to which the driving voltage EVDD is supplied and may be supplied to the display panel 110. When the output current I_output is unstably supplied to the display panel 110, a flicker may occur in the image represented through the display panel 110. Thus, the output current I_output may be sensed to determine whether the output current I_output is stably supplied to the display panel 110.

As illustrated in FIG. 6, the display device 100 may include a current sensing circuit 600 for sensing the output current I_output.

The current sensing circuit 600 may be configured as a circuit for measuring the magnitude of the current. For example, as shown in FIG. 6, the current sensing circuit 600 may include a circuit unit 610 and a resistor unit 620.

The circuit unit 610 may be electrically connected between the first node N61, the second node N62, and the third node N63. The resistor unit 620 may be electrically connected between the first node N61 and the second node N62. The circuit unit 610 and the resistor unit 620 may be connected in parallel.

The driving voltage EVDD may be supplied to the first node N61. The second node N62 may be electrically connected to the display panel 110. The line through which the driving voltage EVDD is supplied to the first node N61 may be referred to as a driving voltage line front end portion DVL_f. The line electrically connecting the second node N62 and the display panel 110 may be referred to as a driving voltage line rear end portion DVL_e.

The resistor unit 620 may be a variable resistor, and the magnitude of the variable resistor may be changed within a predetermined resistance range. The resistor unit 620 may be a shunt resistor.

The circuit unit 610 may sense the sensing current I_sen corresponding to the output current I_output based on the voltage across two opposite ends of the resistor unit 620. The circuit unit 610 may sense the sensing current I_sen corresponding to the output current I_output based on the voltage difference between the first node N61 and the second node N62. Further, the circuit unit 610 may calculate the sensing current I_sen based on the output current I_output flowing through the resistor unit 620. The circuit unit 610 may sense the sensing current I_sen flowing from the first node N61 to the second node N62.

The current sensing circuit 600 may supply the sensing current I_sen to the controller 140. The sensing current I_sen sensed by the circuit unit 610 may be supplied to the controller 140. For example, the circuit unit 610 may include an analog-to-digital converter ADC, and the sensing current I_sen sensed from the circuit unit 610 may be supplied to the controller 140 by an I2C communication method. However, the method in which the sensing current I_sen may be supplied to the controller 140 is not so limited.

The controller 140 may control the output current I_output based on the supplied sensing current I_sen.

Figure 7:
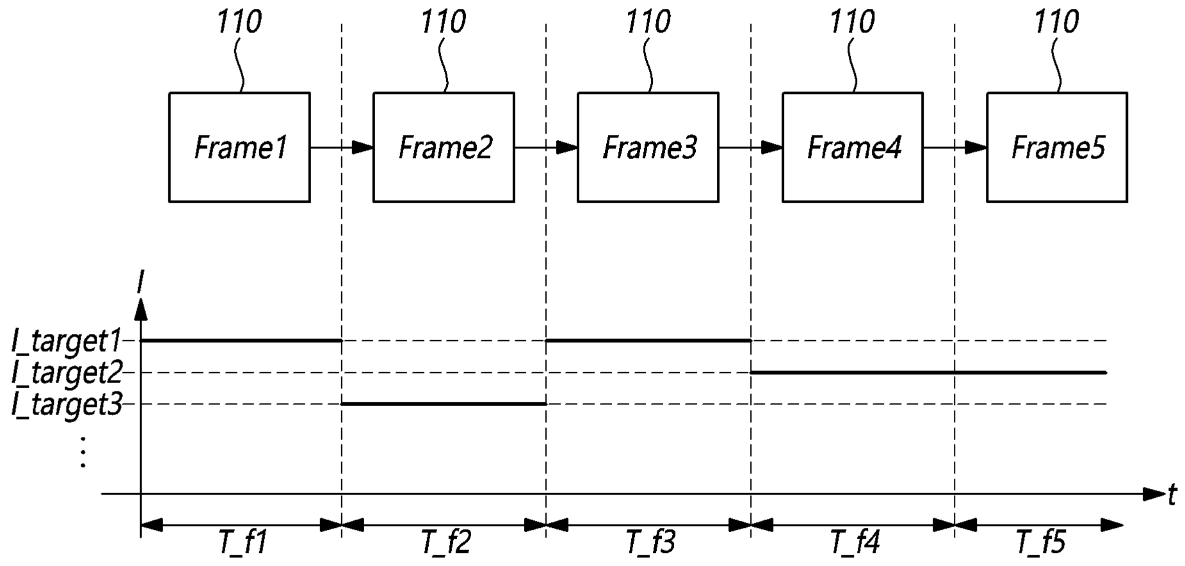
FIG. 7 is a view illustrating a target current for an image frame according to example embodiments of the disclosure.
Figure 8:
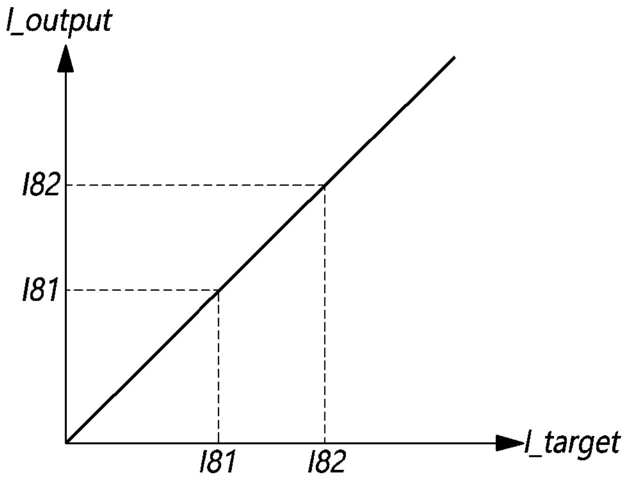
FIG. 8 is a view illustrating the relationship between output current and target current according to example embodiments of the disclosure.
Figure 9:
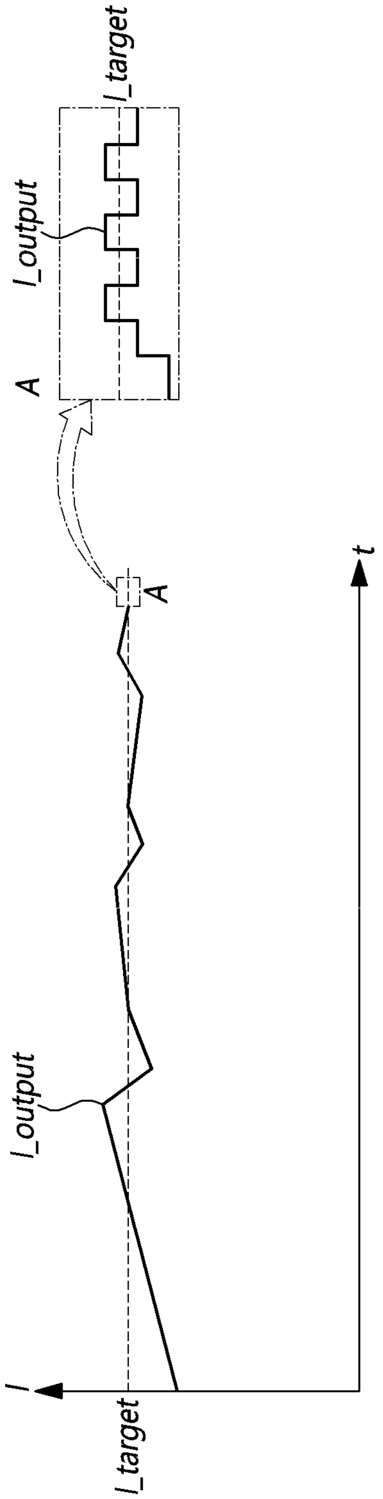
FIG. 9 is a view illustrating controlling an output current according to example embodiments of the disclosure.

FIG. 7 is a view illustrating a target current I_target for an image frame Frame according to example embodiments of the disclosure. FIG. 8 is a view illustrating the relationship between output current I_output and target current I_target according to example embodiments of the disclosure. FIG. 9 is a view illustrating controlling an output current I_output according to example embodiments of the disclosure.

To represent an image frame, the display panel 110 may be driven with a predetermined luminance. To output the image frame from the display panel 110, the output current I_output may be supplied to the display panel 110 through the driving voltage line DVL. The output current I_output may be a current corresponding to a predetermined luminance. In order for the display panel 110 to be driven at the predetermined luminance, the output current I_output corresponding to the predetermined luminance should be supplied to the display panel 110. However, the output current I_output may be supplied unstably, and in this case, a flicker may occur in the display panel 110.

In order to prevent the flicker, the magnitude of the output current I_output may be controlled so that the output current I_output corresponds to the predetermined luminance. The output current I_output for driving the display panel 110 with the predetermined luminance may be pre-calculated, and the pre-calculated output current I_output may be referred to as a target current I_target.

As shown in FIG. 8, as the current supplied to the display panel 110 may be controlled to be the target current I_target, and the magnitude of the output current I_output may be the same as the target current I_target.

As illustrated in FIG. 7, the image frame Frame may include a first image frame Frame1 to a fifth image frame Frame5. The first to the fifth image frames Frame1 to Frame5 may be output from the display panel 110 over time t.

Each of the first to the fifth image frames Frame1 to Frame5 may be represented with a predetermined luminance through the display panel 110.

In order for the first image frame Frame1 to be output from the display panel 110, a first target current I_target1 may be supplied to the display panel 110 during a first frame period T_f1.

In order for the second image frame Frame2 to be output from the display panel 110, a third target current I_target3 may be supplied to the display panel 110 during a second frame period T_f2.

In order for the third image frame Frame3 to be output from the display panel 110, a first target current I_target1 may be supplied to the display panel 110 during a third frame period T_f3.

In order for the fourth image frame Frame4 to be output from the display panel 110, a second target current I_target2 may be supplied to the display panel 110 during a fourth frame period T_f4.

In order for the fifth image frame Frame5 to be output from the display panel 110, a second target current I_target2 may be supplied to the display panel 110 during a fifth frame period T_f5.

The magnitude relation between the first target current I_target1 to the third target current I_target3 may be:

$$\text{first target current } I\_\text{target1} > \text{second target current } I\_\text{target2} > \text{third target current } I\_\text{target3}.$$

For convenience of description, the image frames Frame are illustrated as including the first image frame Frame1 to the fifth image frame Frame5, but the number of image frames Frame is not so limited. For convenience of description, the first target current I_target1 to the third target current I_target3 are illustrated by way of example, but the magnitude of the target current I_target is not so limited.

As shown in FIG. 8, as the current supplied to the display panel 110 may be controlled to be the target current I_target, and the magnitude of the output current I_output may be the same as the target current I_target.

As illustrated in FIG. 8, when the magnitude of the target current I_target is a first current 181, the magnitude of the output current I_output may also be the first current 181, and when the magnitude of the target current I_target is a second current 182, the magnitude of the output current I_output may also be the second current 182.

As shown in FIG. 9, an output current I_output may be determined and controlled by the controller 140.

As illustrated in FIG. 9, the output current I_output may be determined and controlled to be the same as the target current I_target.

As the data voltage Vdata supplied to the display panel 110 is controlled, the magnitude of the output current I_output may be controlled. For example, if the magnitude of the output current I_output needs to be increased by 5%, the magnitude of the data voltage Vdata supplied to the display panel 110 may be increased by 5%. If the magnitude of the output current I_output needs to be reduced by 10%, the magnitude of the data voltage Vdata supplied to the display panel 110 may be reduced by 10%.

As illustrated in FIG. 9, when the output current I_output is smaller than the target current I_target, the output current I_output may be controlled to increase to the target current I_target. When the output current I_output is larger than the target current I_target, the output current I_output may be controlled to decrease to the target current I_target. The above-described method may be called a "current tracking method." As shown in FIG. 9, the output current I_output may be controlled to be a target current I_target while indicating a form similar to a form of under damping.

As the output current I_output is controlled to be the same as the target current I_target, the output current I_output may be stably supplied to the display panel 110.

However, the above-described current tracking method may have the following problems. When the output current I_output changes even a little according to a change in the external environment, the current tracking method may be applied to control the output current I_output to be the same as the target current I_target while taking the form of under damping. In FIG. 9, area A which is an enlarged graph area is illustrated as an example. In area A, the output current I_output may be determined and controlled as if it vibrates around the target current I_target. This is a vibration form of a current generated as the output current I_output is controlled according to a change in the above-described external environment. Due to the above-described current vibration form, a flicker may occur in the display panel 110. Further, when the display device 100 is driven at a high refresh rate, a ringing may occur.

Accordingly, embodiments of the present disclosure may provide a display device and a method for driving the display device, capable of stably supplying current to a driving voltage line.

Accordingly, embodiments of the present disclosure may provide a display device and a method for driving the display device that may prevent flicker.

Accordingly, embodiments of the present disclosure may provide a display device and a method for driving the display device that enable low power consumption by preventing flicker.

Figure 10:
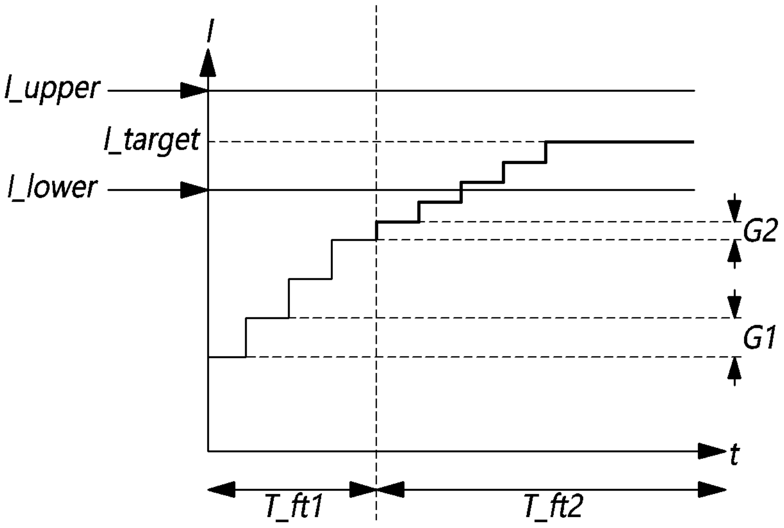
FIGS. 10 and 11 are graphs illustrating a method for controlling an output current according to example embodiments of the disclosure.
Figure 11:
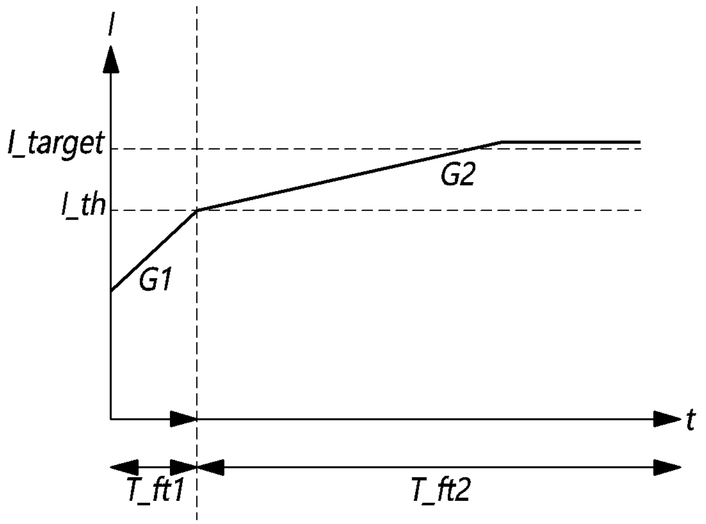

FIGS. 10 and 11 are graphs illustrating a method for controlling an output current I_output according to example embodiments of the present disclosure. FIGS. 12, 13, 14, 15, 16, and 17 are graphs illustrating a stable current range according to example embodiments of the present disclosure.

The controller 140 may receive the sensing current I_sen from the circuit unit 610 (see, e.g., FIG. 6). The controller 140 may control the output current I_output based on the sensing current I_sen. The controller 140 may control the output current I_output through the fast filter mode (FFM) or the slow filter mode (SFM).

The controller 140 may compare the sensing current I_sen with the target current I_target.

When the sensing current I_sen and the target current I_target are the same, the controller 140 may control the output current I_output to be maintained in the current state. When the sensing current I_sen is included in a stable current range, the controller 140 may control the output current I_output to be maintained in the current state. The stable current range is described below.

When the sensing current I_sen and the target current I_target are different from each other, the controller 140 may control the magnitude of the output current I_output to be changed. In this case, there may be a case in which the difference in magnitude between the sensing current I_sen and the target current I_target is larger than the reference data K, and a case in which the difference in magnitude between the sensing current I_sen and the target current I_target is less than or equal to the reference data K.

When the difference in magnitude between the sensing current I_sen and the target current I_target is larger than the reference data K, the controller 140 may control the output current I_output through the fast filter mode FFM. As illustrated in FIG. 10, a first filter period T_ft1, which is a period when the fast filter mode FFM is applied, may be identified. As shown in FIG. 10, when the sensing current I_sen is smaller than the target current I_target, the output current I_output may be increased by the first gain G1 during the first filter period T_ft1. Although not illustrated in FIG. 10, when the sensing current I_sen is larger than the target current I_target, the output current I_output may be reduced by the first gain G1 during the first filter period T_ft1.

As illustrated in FIG. 10, the output current I_output may be controlled by the first gain G1 and then may be controlled by the first gain G1 once again. For example, while the first image frame is displayed, the first output current may be controlled by the first gain G1. Then, while the second image frame is displayed, the second output current may be controlled by the first gain G1 again.

When the difference in magnitude between the sensing current I_sen and the target current I_target is less than or equal to the reference data K, the controller 140 may control the output current I_output through the slow filter mode SFM. As shown in FIG. 10, a second filter period T_ft2, which is a period when the slow filter mode SFM is applied, may be identified. As illustrated in FIG. 10, when the sensing current I_sen is smaller than the target current I_target, the output current I_output may be increased by the second gain G2 during the second filter period T_ft2. Although not illustrated in FIG. 10, when the sensing current I_sen is larger than the target current I_target, the output current I_output may be reduced by the second gain G2 during the second filter period T_ft2.

as shown in FIG. 10, the output current I_output may be controlled by the second gain G2 and then may be controlled by the second gain G2 once again. For example, while the third image frame is displayed, the third output current may be controlled by the second gain G2. Then, while the fourth image frame is displayed, the fourth output current may be controlled by the second gain G2 again.

As shown in FIG. 11, the fast filter mode FFM and the slow filter mode SFM may be divided with respect to a limit current I_th.

As illustrated in FIG. 11, when the output current I_output is smaller than the limit current I_th, it is determined that the difference in magnitude between the sensing current I_sen and the target current I_target is larger than the reference data K, and the controller 140 may control the output current I_output through the fast filter mode FPM. When the sensing current I_sen is smaller than the target current I_target, the output current I_output may be increased by the first gain G1 during the first filter period T_ft1, and thus the current per unit time may be increased by the first gain G1. In the opposite case, when the sensing current I_sen is larger than the target current I_target (not illustrated in FIG. 11), the current per unit time may be reduced by the first gain G1.

As shown in FIG. 11, when the output current I_output is larger than the limit current I_th, it is determined that the difference in magnitude between the sensing current I_sen and the target current I_target is smaller than the reference data K, and the controller 140 may control the output current I_output through the slow filter mode SFM. When the sensing current I_sen is smaller than the target current I_target, the output current I_output may be increased by the second gain G2 during the second filter period T_ft2, and thus the current per unit time may be increased by the second gain G2. In the opposite case, when the sensing current I_sen is larger than the target current I_target (not illustrated in FIG. 11), the current per unit time may be reduced by the second gain G2.

The output current I_output may be controlled while the image frame is displayed through the display panel 110. For example, a plurality of image frames may include a first image frame to a third image frame. The first output current while the first image frame is displayed and the second output current while the second image frame is displayed may differ by the first gain G1. The third output current while the third image frame is displayed may be different, by the second gain G2, from the second output current while the second image frame is displayed.

As shown in FIG. 10, the controller 140 may control to make the output current I_output equal to the target current I_target. However, when the output current I_output is included in a stable current range, the controller 140 may control the output current I_output to be maintained even if the output current I_output is not the same as the target current I_target.

The upper limit of the above-described stable current range may be the upper limit target current I_upper, and the lower limit of the above-described stable current range may be the lower limit target current I_lower. The upper limit target current I_upper, which is the upper limit of the stable current range, may be larger than the target current I_target, and the lower limit target current I_lower, which is the lower limit of the stable current range, may be smaller than the target current I_target.

The upper limit target current I_upper and the lower limit target current I_lower may be variously designed based on the target current I_target. Examples of the upper limit target current I_upper and the lower limit target current I_lower are described below with reference to FIGS. 12 to 17.

As shown in FIGS. 12 to 17, the output current I_output graph compared to the target current I_target may be identified. A line for the output current I_output corresponding to the target current I_target may be referred to as a target line. A line related to the upper limit target current I_upper may be referred to as an upper control level. A line related to the lower limit target current I_lower may be referred to as a lower control level.

Figure 12:
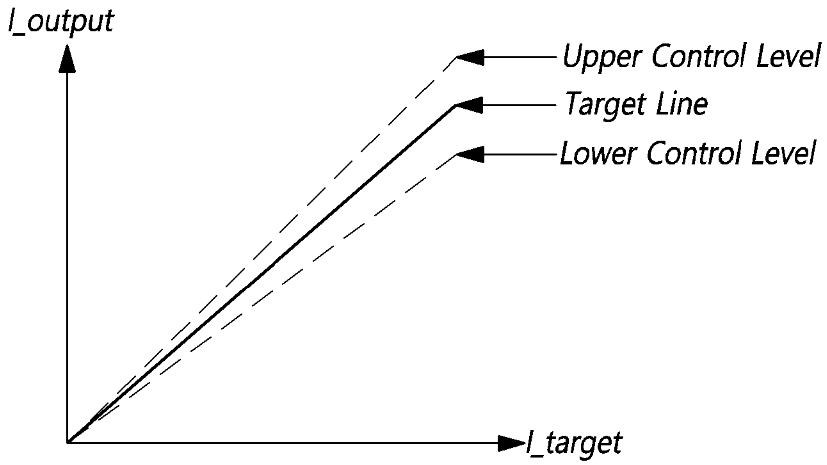
FIGS. 12, 13, 14, 15, 16, and 17 are graphs illustrating a stable current range according to example embodiments of the disclosure.

As illustrated in FIG. 12, the upper limit target current I_upper and the lower limit target current I_lower may have a value obtained by multiplying the target current I_target by a predetermined ratio. For example, when the predetermined ratio is 5%, the upper limit target current I_upper may be (target current I_target*(1+0.05)), and the lower limit target current I_lower may be (target current I_target*(1−0.05)). A first ratio of 1.05 which is increased by a predetermined ratio of 5% may be applied to the upper limit target current I_upper, and a second ratio of 0.95 which is decreased by a predetermined ratio of 5% may be applied to the lower limit target current I_lower. The above-described method of designing the upper limit target current I_upper and the lower limit target current I_lower may be referred to as a "first method."

Figure 13:
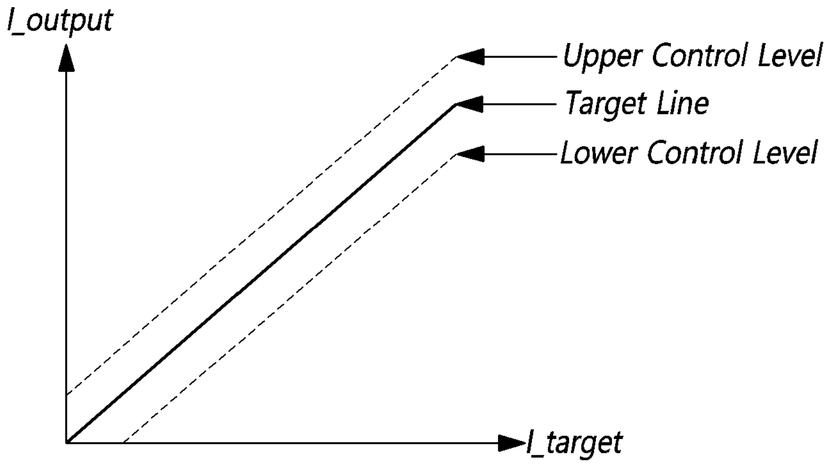

As illustrated in FIG. 13, the upper limit target current I_upper and the lower limit target current I_lower may have a value obtained by adding a predetermined offset to the target current I_target. For example, when the predetermined offset is 5, the upper limit target current I_upper may be (target current I_target+5), and the lower limit target current I_lower may be (target current I_target−5). The above-described method of designing the upper limit target current I_upper and the lower limit target current I_lower may be referred to as a "second method."

Figure 14:
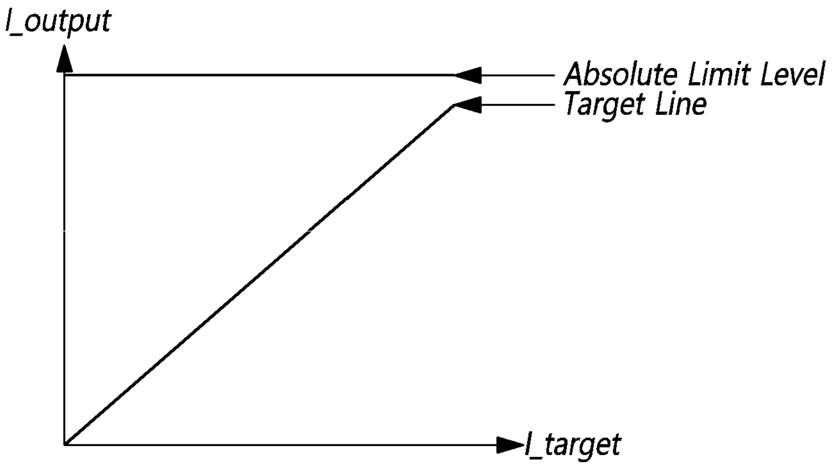

As illustrated in FIG. 14, an absolute limit level for the upper limit target current I_upper may be identified. When the upper limit target current I_upper is larger than a predetermined current, the display device 100 may be overloaded. In order to prevent the above-described overload, the upper limit target current I_upper may be limited not to be larger than the predetermined current. In other words, the controller 140 may control the upper limit target current I_upper not to exceed the absolute limit level. The above-described method of designing the upper limit target current I_upper and the lower limit target current I_lower may be referred to as a "third method."

Figure 15:
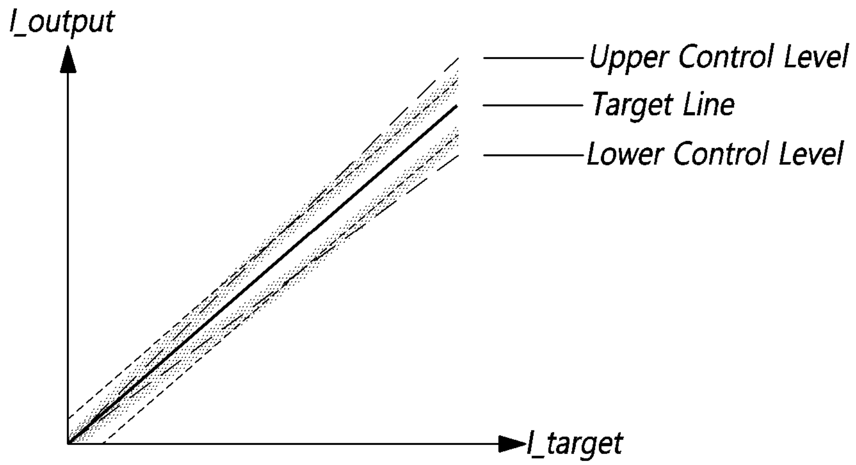

As shown in FIG. 15, the upper limit target current I_upper and the lower limit target current I_lower may be set by applying the first method and the second method. The upper limit target current I_upper may be determined as the smaller of (target current I_target*(1+0.05)) and (target current I_target+5). The lower limit target current I_lower may be determined as the larger of (target current I_target*(1−0.05)) and (target current I_target−5). Accordingly, the stable current range may be set to be relatively narrow, and the output current I_output may be controlled to be as close to the target current I_target as possible.

Figure 16:
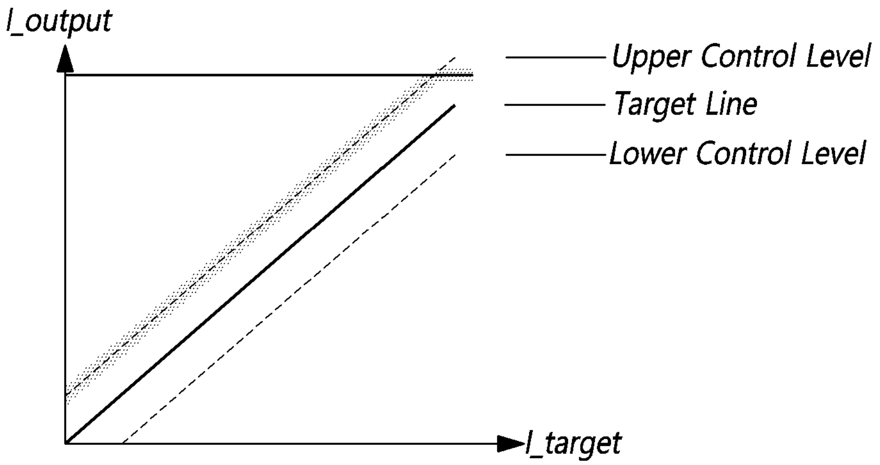

As shown in FIG. 16, the upper limit target current I_upper and the lower limit target current I_lower may be set by applying the second method and the third method. The upper limit target current I_upper may be determined as the smaller of (target current I_target+5) and the absolute limit level. The lower limit target current I_lower may be (target current I_target−5). Accordingly, while the upper limit target current I_upper is controlled not to exceed the absolute limit level, the stable current range may be relatively narrowed.

Figure 17:
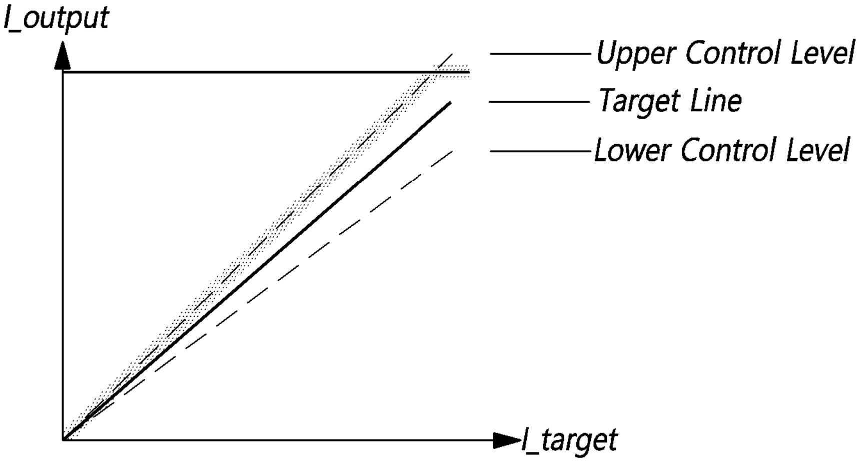

As illustrated in FIG. 17, the upper limit target current I_upper and the lower limit target current I_lower may be set by applying the first method and the third method. The upper limit target current I_upper may be determined as the smaller of (target current I_target*(1+0.05)) and an absolute limit level. The lower limit target current I_lower may be (target current I_target*(1−0.05)). Accordingly, while the upper limit target current I_upper is controlled not to exceed the absolute limit level, the stable current range may be relatively narrowed.

Figure 18:
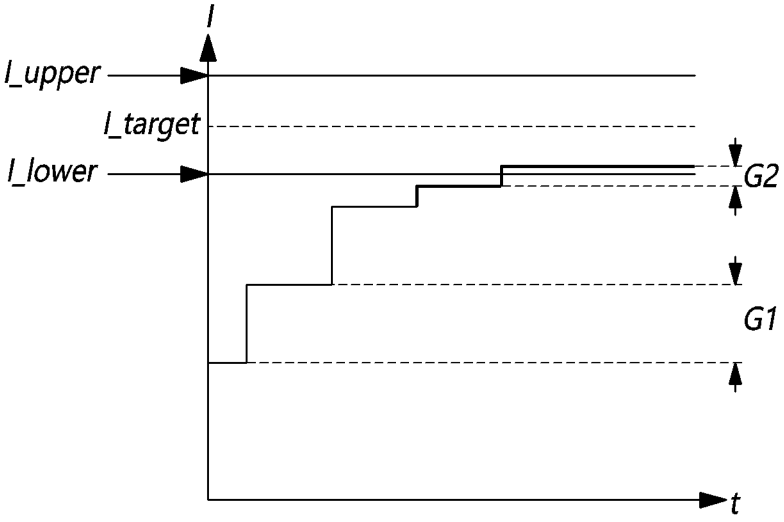
FIG. 18 is a graph illustrating a method for controlling an output current according to example embodiments of the disclosure.
Figure 19:
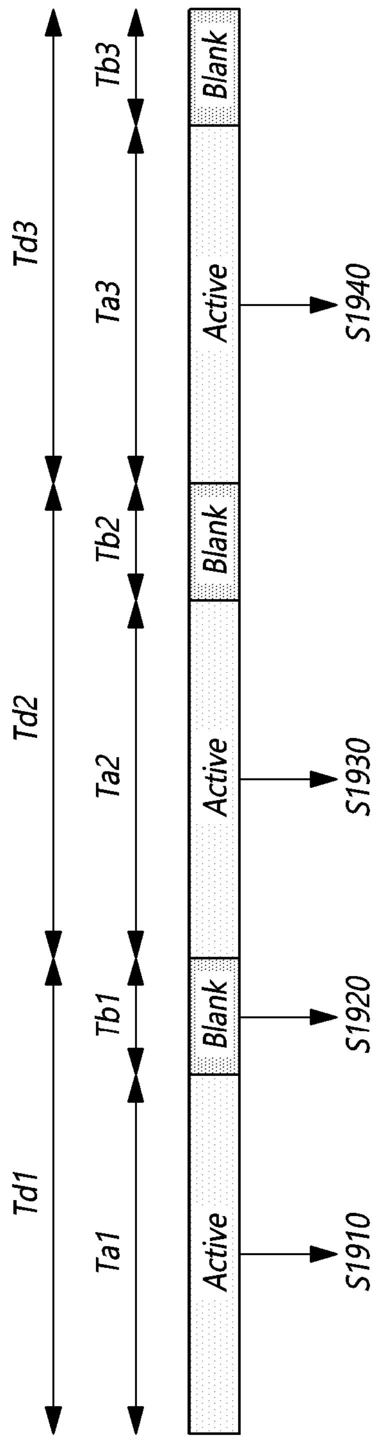
FIGS. 19 and 20 are views illustrating image frame delay driving according to example embodiments of the disclosure.
Figure 20:
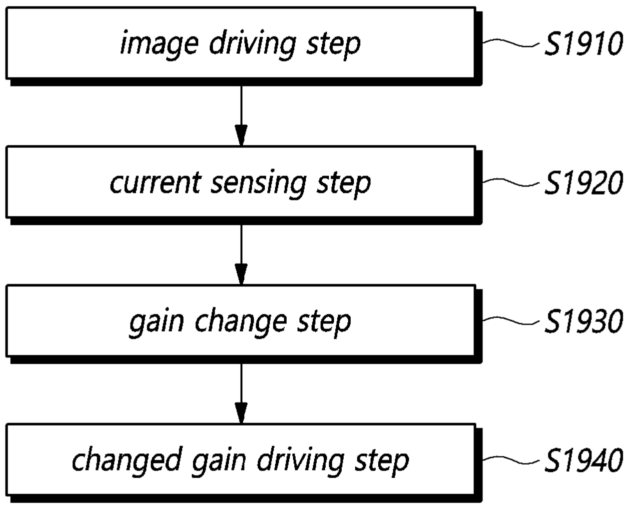

FIG. 18 is a graph illustrating a method for controlling an output current I_output according to example embodiments of the present disclosure. FIGS. 19 and 20 are views illustrating image frame delay driving according to example embodiments of the present disclosure.

A method for setting the upper limit target current I_upper and the lower limit target current I_lower has been described with reference to FIGS. 12 to 17. As illustrated in FIG. 10, the controller 140 may control to make the output current I_output equal to the target current I_target.

However, as shown in FIG. 18, when the output current I_output is included in the stable current range, the controller 140 may control the output current I_output to be maintained even if the output current I_output is not the same as the target current I_target. When the output current I_output is included in the stable current range and the output current I_output is maintained, the output current I_output may be maintained in a state in which it is close to the upper limit target current I_upper or the lower limit target current I_lower. As illustrated in FIG. 18, the output current I_output may be maintained in a state in which it is close to the lower limit target current I_lower.

As the output current I_output maintained in the state of being close to the lower limit target current I_lower has a current value close to the target current I_target, the display device 100 may be driven more stably, preventing flickering. In order to more stably prevent flickering, "image frame delay driving" may be performed.

As shown in FIG. 20, the image frame delay driving may include an image driving step S1910, a current sensing step S1920, a gain change step S1930, and a changed gain driving step S1940.

As illustrated in FIG. 19, the first image driving period Td1 may include a first active period Ta1 and a first blank period Tb1. The second image driving period Td2 following the first image driving period Td1 may include a second active period Ta2 and a second blank period Tb2. The third image driving period Td3 following the second image driving period Td2 may include a third active period Ta3 and a third blank period Tb3.

The image driving step S1910 may be performed in a period during which an image is displayed through the display panel 110. The image driving step S1910 may be performed during the first active period Ta1. During the first active period Ta1, a corresponding data voltage Vdata may be supplied to each of the plurality of subpixels SP disposed on the display panel 110. During the first active period Ta1, the output current I_output may flow through the driving voltage line DVL.

The current sensing step S1920 may be performed in a period for sensing the output current I_output. The current sensing step S1920 may be performed during the first blank period Tb1. During the first blank period Tb1, the current sensing circuit 600 (see, e.g., FIG. 6) may sense the output current I_output. After the current sensing circuit 600 senses the output current I_output, the current sensing circuit 600 may supply the sensing current I_sen to the controller 140.

The gain change step S1930 may be performed in a period during which the gain G is determined. The gain change step S1930 may be performed during the second active period Ta2. During the second active period Ta2, the controller 140 may determine to change or maintain the gain G. The controller 140 may select the fast filter mode FFM or the slow filter mode SFM based on the sensing current I_sen sensed during the first blank period Tb1.

In the second active period Ta2, when the difference in magnitude between the sensing current I_sen and the target current I_target is larger than the reference data K, the controller 140 may control the output current I_output through the fast filter mode FFM. The output current I_output may be increased or decreased by the first gain G1.

In the second active period Ta2, when the difference in magnitude between the sensing current I_sen and the target current I_target is less than or equal to the reference data K, the controller 140 may control the output current I_output through the slow filter mode SFM. The output current I_output may be increased or decreased by the second gain G2.

The changed gain driving step S1940 may be performed in a period during which the display device 100 is driven by applying the changed gain G. The changed gain driving step S1940 may be performed during the third active period Ta3. For example, when the gain G determined during the second active period Ta2 is the first gain G1, the output current I_output supplied to the display panel 110 may be controlled by the first gain G1. Further, when the gain G determined during the second active period Ta2 is the second gain G2, the output current I_output supplied to the display panel 110 may be controlled by the second gain G2.

In other words, during the first blank period Tb1 included in the first image driving period Td1, the controller 140 may receive the first sensing current from the current sensing circuit 600. Then, during the second active period Ta2 included in the second image driving period Td2 following the first image driving period Td1, the controller 140 may determine the first gain G1 or the second gain G2 as a gain based on the first sensing current. Then, during the third active period Ta3 included in the third image driving period Td3 following the second image driving period Td2, the controller 140 may control the output current I_output by the determined gain.

The gain G for the image frame during the first active period Ta1 may be applied during the third active period Ta3. In other words, since the gain G is applied after two image frames relative to the image frame of the first active period Ta1, this may be referred to as a "2 frame delay driving."

The "2 frame delay driving" may be applied as an "n frame delay driving." In other words, when the active period Ta in which the changed gain driving step S1940 is performed is rendered to be different, the "n frame delay driving" may be performed. For example, when the changed gain driving step S1940 is performed in the fourth active period Ta4, a "3 frame delay driving" may be performed. When the changed gain driving step S1940 is performed in the fifth active period Ta5, a "4 frame delay driving" may be performed.

Through the image frame delay driving, the output current I_output maintained in a state of being close to the lower limit target current I_lower may have a current value close to the target current I_target. Accordingly, the display device 100 may be driven more stably, preventing flickering.

In the "n frame delay driving" for allowing the output current I_output maintained in the state of being close to the lower limit target current I_lower to have a current value close to the target current I_target, n may be determined by the magnitude of the gain G, the stable current range, the relative difference in magnitude between the upper limit target current I_upper and the target current I_target, and the relative difference in magnitude between the lower limit target current I_lower and the target current I_target.

For example, when the magnitude of the gain G is relatively small compared to the difference in current magnitude between the target current I_target and the lower limit target current I_lower, n in the "n frame delay driving" may be determined to be relatively large.

For example, when the difference in current magnitude between the target current I_target and the lower limit target current I_lower is not large as compared to the magnitude of the gain G, n in the "n frame delay driving" may be determined to be relatively small.

Figure 21:
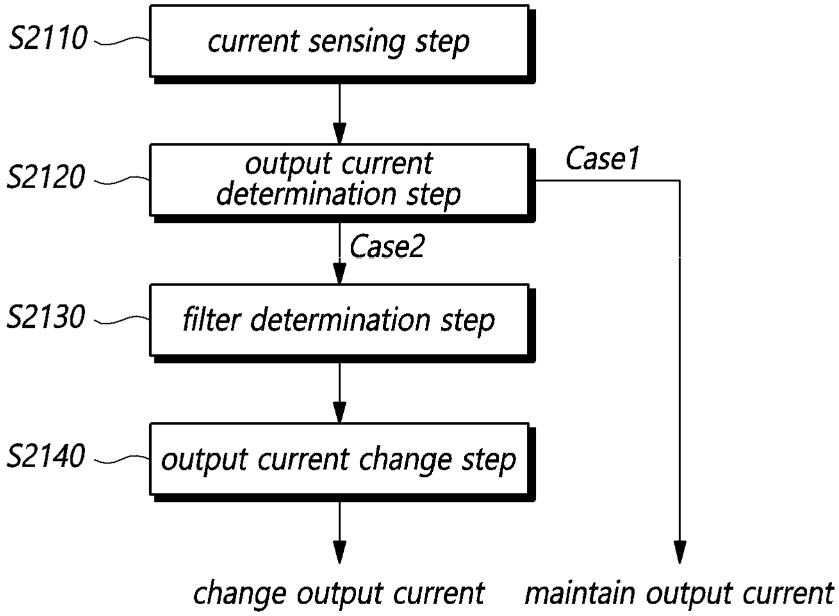
FIG. 21 is a flowchart illustrating a method for driving a display device to control an output current according to example embodiments of the disclosure.

FIG. 21 is a flowchart illustrating a method for driving a display device 100 to control an output current according to example embodiments of the present disclosure.

A method for driving a display device 100 to control an output current may include a current sensing step S2110, an output current determination step S2120, a filter determination step S2130, and an output current change step S2140.

The current sensing step S2110 may be performed in a period for sensing the output current I_output. During the current sensing step S2110, the current sensing circuit 600 may sense the output current I_output. After the current sensing circuit 600 (see, e.g., FIG. 6) senses the output current I_output, the current sensing circuit 600 may supply the sensing current I_sen to the controller 140.

The output current determination step S2120 may be a step in which the sensing current I_sen and the target current I_target are compared.

As a result of comparing the sensing current I_sen and the target current I_target during the output current determination step S2120, the sensing current I_sen and the target current I_target may be determined to be the same (Case1).

In this case, the controller 140 may control the output current I_output to be maintained in the current state. If the sensing current I_sen is included in a stable current range of the target current I_target, the controller 140 may control the output current I_output to be maintained in the current state.

As a result of comparing the sensing current I_sen and the target current I_target during the output current determination step S2120, the sensing current I_sen may be determined to be outside a stable current range of the target current I_target may (Case2). In this case, the filter determination step S2130 may be performed after the output current determination step S2120.

The filter determination step S2130 may be a step of determining a filter mode for controlling the output current I_output.

In the filter determination step S2130, if the difference in magnitude between the sensing current I_sen and the target current I_target is larger than the reference value K, the controller 140 may control the output current I_output through the fast filter mode FFM.

In the filter determination step S2130, if the difference in magnitude between the sensing current I_sen and the target current I_target is less than or equal to the reference value K, the controller 140 may control the output current I_output through the slow filter mode SFM.

The output current change step S2140 may be performed in a period during which the output current is controlled by the gain G.

In the filter determination step S2130, if the fast filter mode FFM is applied, the output current I_output may be increased or decreased by the first gain G1.

In the filter determination step S2130, if the slow filter mode SFM is applied, the output current I_output may be increased or decreased by the second gain G2.

Figure 22:
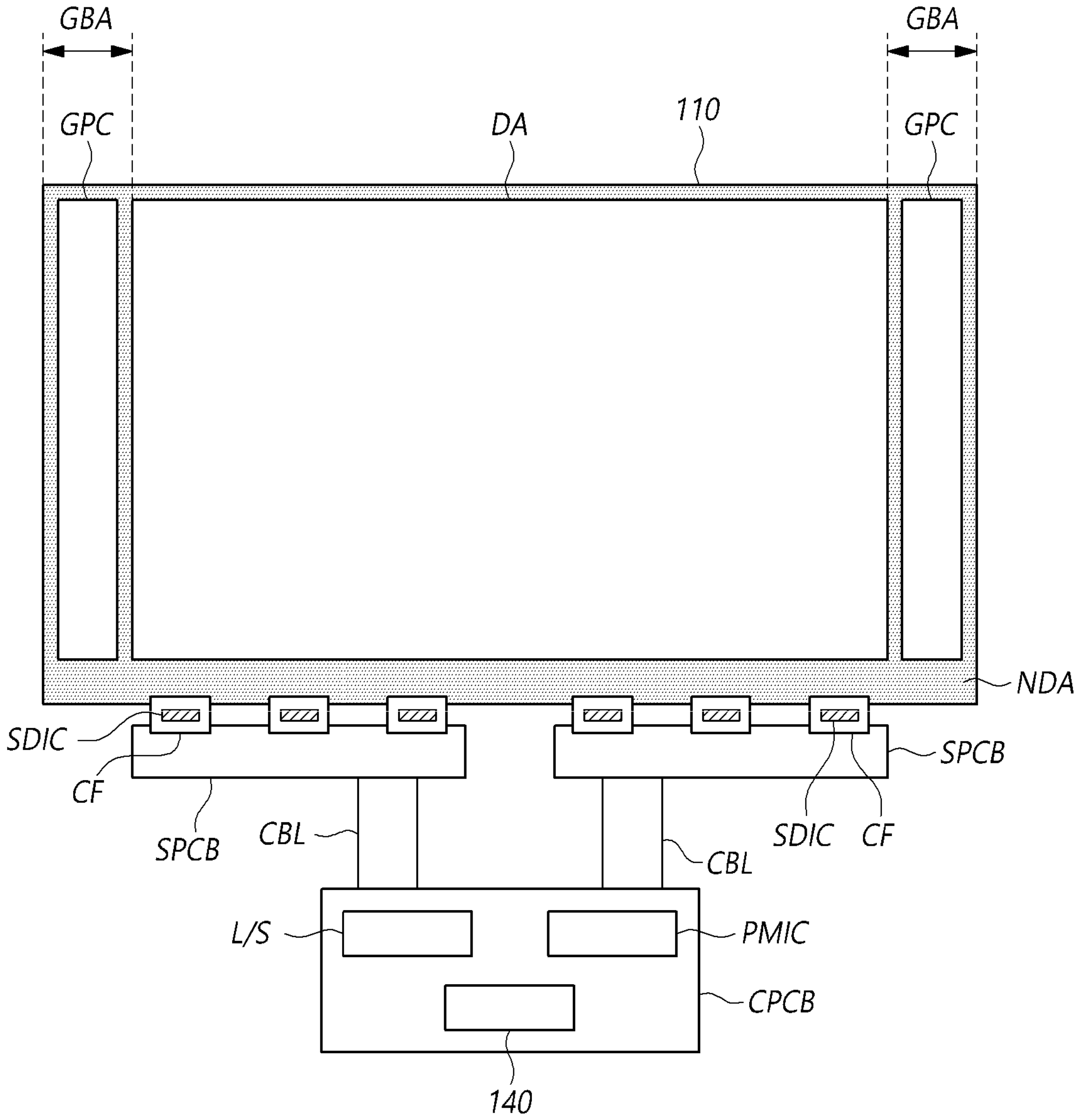
FIG. 22 is a view illustrating an example system implementation of a display device according to example embodiments of the disclosure.

When the method for driving the display device 100 to control the output current is applied to the display device, if the difference in magnitude between the sensing current I_sen and the target current I_target is large, the fast filter mode FFM may be applied, reducing the difference in magnitude between the output current I_output and the target current I_target at a faster rate. Further, if the difference in magnitude between the sensing current I_sen and the target current I_target is small, the slow filter mode SFM may be applied, controlling the output current I_output to stably become the target current I_target or be within a stable range of the target current I_target. FIG. 22 is a view illustrating an example system implementation of a display device according to embodiments of the present disclosure.

As illustrated in FIG. 22, the display panel 110 may include a display area DA for displaying images and a non-display area NDA in which no image is displayed.

According to the implementation example of FIG. 22, the data driving circuit 120 (see, e.g., FIG. 1) may include a plurality of source driver integrated circuits SDIC and may be implemented in a chip on film (COF) method. Each of the plurality of source driver integrated circuits SDIC may be mounted on the circuit film CF connected to the non-display area NDA of the display panel 110. Here, the circuit film CF is also referred to as a flexible printed circuit.

According to the implementation example of FIG. 22, the gate driving circuit 130 (see, e.g., FIG. 1) may be implemented in a gate in panel (GIP) type. Hereinafter, the gate driving circuit 130 implemented in the GIP type is also referred to as a "gate driving panel circuit GPC."

The gate driving panel circuit GPC may be formed in the non-display area NDA of the display panel 110. According to the implementation example of FIG. 22, the gate driving panel circuit GPC may be disposed in both the non-display area NDA positioned outside one side of the display area DA and the non-display area NDA positioned outside the other side of the display area DA.

The display device 100 may include at least one source printed circuit board SPCB for a circuit connection between the plurality of source driver integrated circuits SDIC and the other devices (e.g., 140, L/S, PMIC, etc.), and a control printed circuit board CPCB for mounting control components and various electric devices.

The circuit film CF on which the source driver integrated circuit SDIC is mounted may be connected to at least one source printed circuit board SPCB. In other words, one side of the source driver integrated circuit SDIC-mounted circuit film CF may be electrically connected with the display panel 110, and the opposite side thereof may be electrically connected with the source printed circuit board SPCB.

The controller 140, the power management integrated circuit PMIC, and the like may be mounted on the control printed circuit board CPCB.

The controller 140 may perform an overall control function related to driving of the display panel 110 and may control operations of the plurality of source driver integrated circuits SDIC and the gate driving panel circuit GPC.

The power management integrated circuit PMIC may supply various voltages or currents to the plurality of source driver integrated circuits SDIC, gate driving panel circuit GPC, or the like, or may control various voltages or currents to be supplied.

At least one source printed circuit board SPCB and the control printed circuit board CPCB may be circuit-connected through at least one connection cable CBL. Here, the connection cable CBL may be, e.g., either a flexible printed circuit (FPC) or a flexible flat cable (FFC).

The at least one source printed circuit board SPCB and the control printed circuit board CPCB may be integrated into a single printed circuit board.

The display device 100 according to example embodiments of the present disclosure may further include a level shifter L/S for adjusting the voltage level of signal. For example, the level shifter L/S may be disposed on a control printed circuit board CPCB or a source printed circuit board SPCB.

In the display device 100 according to example embodiments of the present disclosure, the level shifter L/S may output signals for gate driving to the gate driving panel circuit GPC which is the GIP-type gate driving circuit 130.

For example, the power management integrated circuit PMIC may output a signal to the level shifter L/S. The level shifter L/S may adjust the voltage level of the signal input from the power management integrated circuit PMIC. The signal whose voltage level is adjusted by the level shifter L/S may be input to the gate driving panel circuit GPC.

For example, the level shifter L/S may output a plurality of clock signals having different phases to the gate driving panel circuit GPC. The gate driving panel circuit GPC may generate a plurality of gate signals (e.g., the scan signal SC, the sensing signal SE, etc.) based on the plurality of clock signals input from the level shifter L/S and may output the generated plurality of gate signals to a plurality of gate lines (e.g., the scan signal line SCL, the sensing signal line SENL, etc.).

As shown in FIG. 22, the non-display area NDA of the display panel 110 may include a gate bezel area GBA. The gate bezel area GBZ may refer to an area in which the gate driving panel circuit GPC, which is the GIP-type gate driving circuit 130, and various lines connected to the gate driving panel circuit GPC are disposed.

Although not illustrated in FIG. 22, various lines connected to the gate driving panel circuit GPC may include a plurality of clock lines, a high-level gate voltage line, and a low-level gate voltage line.

Described below is the structure of the gate driving panel circuit GPC and the gate bezel area GBA in which the gate driving panel circuit GPC is disposed according to example embodiments of the present disclosure.

Figure 23:
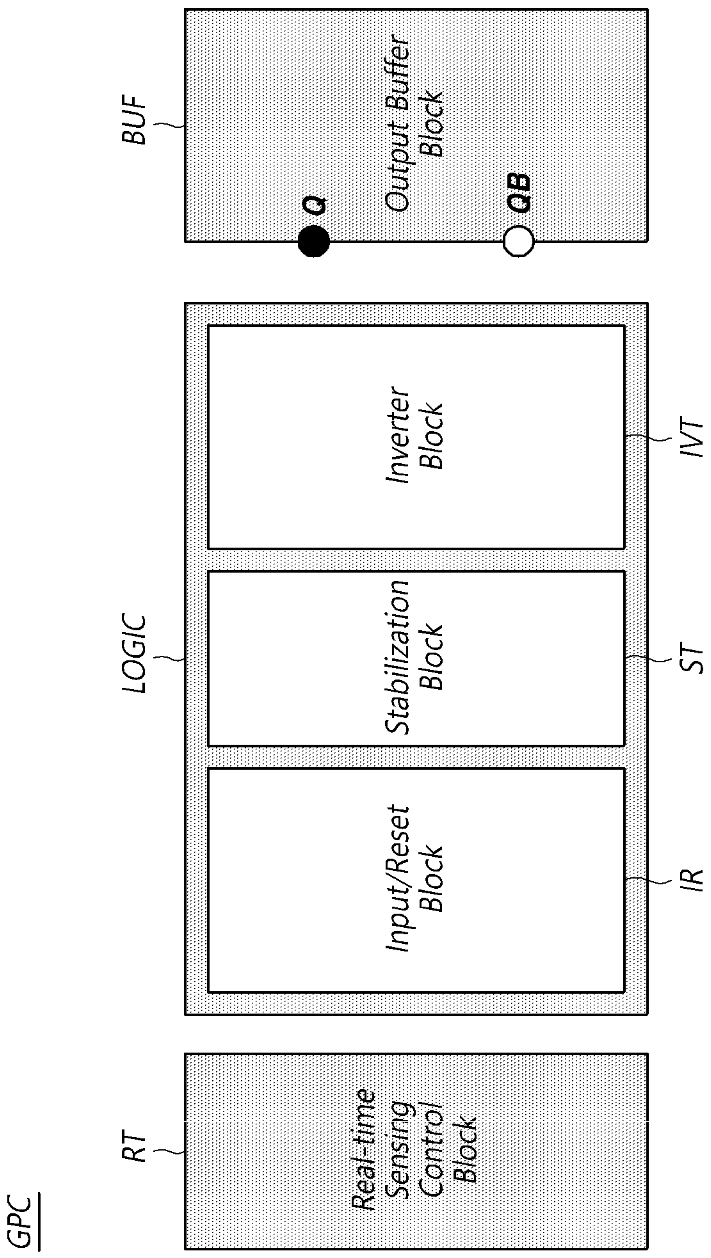
FIG. 23 is a block diagram illustrating a gate driving panel circuit in a display device according to example embodiments of the disclosure.

FIG. 23 is a block diagram illustrating a gate driving panel circuit GPC according to example embodiments of the disclosure.

As shown in FIG. 23, the gate driving panel circuit GPC may include an output buffer block BUF, a logic block LOGIC, and a real-time sensing control block RT.

As illustrated in FIG. 23, the output buffer block BUF may be configured to output two or more gate signals. For example, the output buffer block BUF included in the gate driving panel circuit GPC may output at least one scan signal SC and at least one sensing signal SE (see, e.g., FIG. 24). In this case, the subpixel SP may have a 2-gate driven structure as shown in FIG. 3.

As shown in FIG. 23, the output buffer block BUF may be controlled according to voltage states of a Q node and a QB node. The operation and output of the output buffer block BUF may vary according to voltage states of the Q node and the QB node.

The Q node and the QB node may have different voltage levels. For example, if the voltage of the Q node during a first period is a high-level voltage, the voltage of the QB node may be a low-level voltage. If the voltage of the Q node is a low-level voltage during a second period before or after the first period, the voltage of the QB node may be a high-level voltage.

As illustrated in FIG. 23, the logic block LOGIC may be a circuit block that controls the operation of the output buffer block BUF and implements an operation of a shift register. The logic block LOGIC may control the voltages of the Q node and the QB node to control the operation of the output buffer block BUF.

As shown in FIG. 23, the logic block LOGIC may include an input/reset block IR, a stabilization block ST, and an inverter block IVT.

The input/reset block IR may be a circuit block that controls charging and discharging of the Q node. The inverter block IVT may control the inverted voltage level of the voltage level of the Q node to be the voltage level of the QB node according to the voltage of the Q node. The stabilization block ST may stabilize the Q node and the output according to the voltage of the QB node during a period when the output signal of the gate driving panel circuit GPC has a turn-off level voltage.

Each of the input/reset block IR, the stabilization block ST, and the inverter block IVT may include at least one transistor.

The real-time sensing control block RT may be a circuit block for controlling the operation of the output buffer block BUF for real-time sensing driving. Here, the real-time sensing driving may be sensing driving performed in real time during display driving and sensing driving performed during every blank period Tb between active periods Ta (see, e.g., FIGS. 3 and 4). The real-time sensing driving may be performed in every blank period Tb. The real-time sensing driving may be sensing driving for sensing the mobility of the driving transistor DRT of each subpixel SP (see, e.g., FIG. 2).

The real-time sensing control block RT may include at least one transistor.

The real-time sensing control block RT may control the voltages of the Q node and the QB node such that the output buffer block BUF outputs the scan signal SC and the sensing signal SE to the subpixel SP where the real-time sensing driving is performed.

Figure 24:
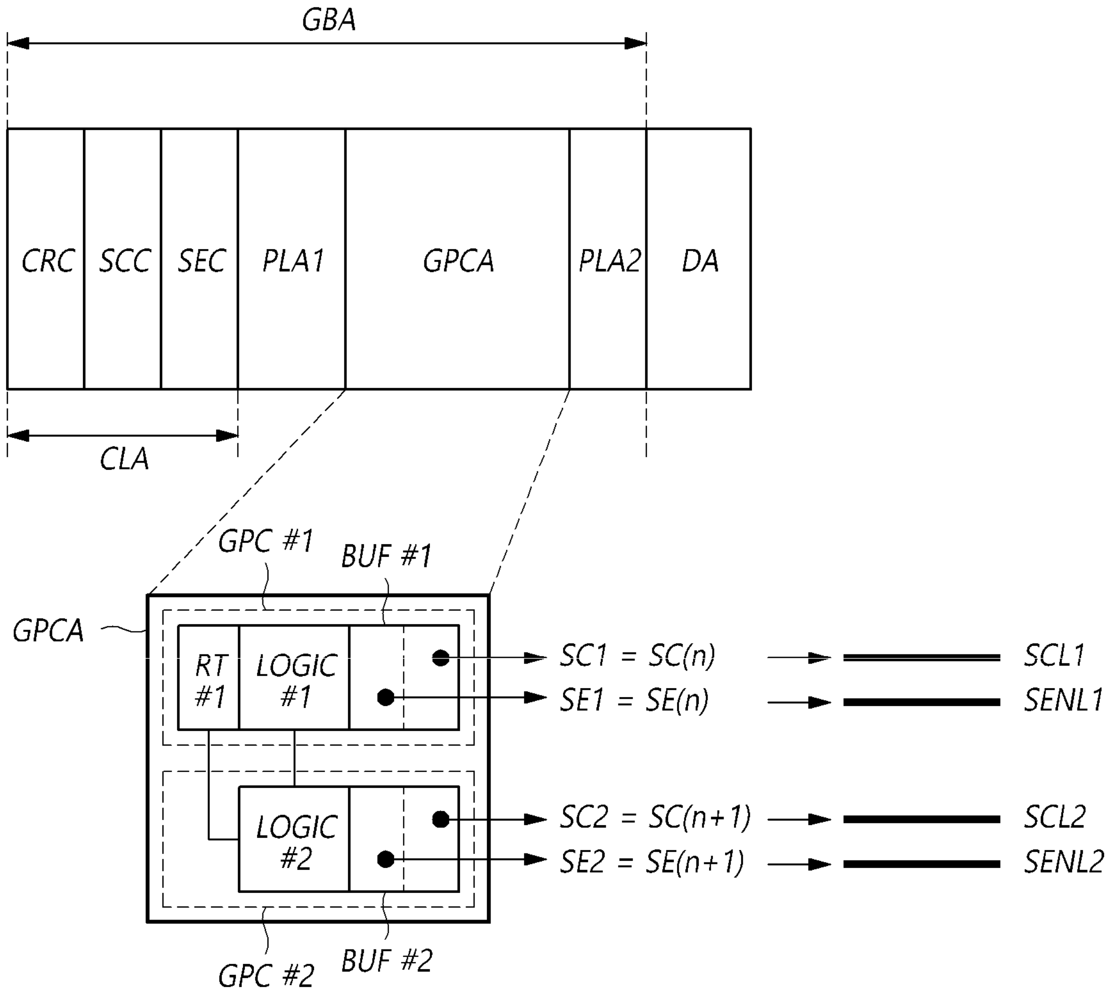
FIG. 24 is a layout view of a gate bezel area in a display panel of a display device according to example embodiments of the disclosure.

FIG. 24 is a layout view of a gate bezel area GBA in a display panel 110 according to example embodiments of the present disclosure.

As shown in FIG. 24, the gate bezel area GBA of the display panel 110 may include a clock signal line area CLA, a first power line area PLA1, a gate driving panel circuit area GPCA, and a second power line area PLA2.

The gate driving panel circuit area GPCA may be an area in which the gate driving panel circuit GPC is disposed. The gate driving panel circuit GPC may output scan signals SC and sensing signals SE to be supplied to the subpixel SP having a 2-gate driving structure.

Various lines for supplying power, voltage, or signals to the gate driving panel circuit GPC may be disposed around the gate driving panel circuit area GPCA. Accordingly, in the gate bezel area GBA, the clock signal line area CLA, the first power line area PLA1, and the second power line area PLA2 may be disposed around the gate driving panel circuit area GPCA.

For example, the clock signal line area CLA and the first power line area PLA1 may be positioned at one side of the gate driving panel circuit area GPCA, and the second power line area PLA2 may be positioned on the other side of the gate driving panel circuit area GPCA.

The gate driving panel circuit area GPCA may be positioned at one side of the second power line area PLA2, and the display area DA may be positioned on the other side of the second power line area PLA2.

The clock signal line area CLA may be an area in which clock signal lines for transferring various clock signals to the gate driving panel circuit GPC are disposed.

The first power line area PLA1 may be an area in which at least one gate high-potential voltage line for transferring at least one gate high-potential voltage to the gate driving panel circuit GPC is disposed.

At least one control signal line for transferring at least one control signal to the gate driving panel circuit GPC may be further disposed in the first power line area PLA1. For example, the at least one control signal may include at least one of a start signal, a reset signal, and a line selection signal.

The second power line area PLA2 may be an area in which at least one gate low-potential voltage line for transferring at least one gate low-potential voltage to the gate driving panel circuit GPC is disposed.

As shown in FIG. 24, the clock signal line area CLA may include a carry clock signal line area CRC, a scan clock signal line area SCC, and a sensing clock signal line area SEC.

The carry clock signal line area CRC may be an area in which carry clock signal lines for transferring carry clock signals to the gate driving panel circuit GPC are disposed.

The scan clock signal line area SCC may be an area in which scan clock signal lines for transferring scan clock signals to the gate driving panel circuit GPC are disposed.

The sensing clock signal line area SEC may be an area in which sensing clock signal lines for transferring sensing clock signals to the gate driving panel circuit GPC are disposed.

The position order of the carry clock signal line area CRC, the scan clock signal line area SCC, and the sensing clock signal line area SEC may be variously set (e.g., CRC-SCC-SEC, SCC-CRC-SEC, SCC-SEC-CRC, SEC-SCC-CRC, etc.).

For example, among the carry clock signal line area CRC, the scan clock signal line area SCC, and the sensing clock signal line area SEC, the scan clock signal line area SCC may be positioned between the carry clock signal line area CRC and the sensing clock signal line area SEC, and the carry clock signal line area CRC may be positioned further away from the display area DA or the gate driving panel circuit area GPCA than the sensing clock signal line area SEC.

As illustrated in FIG. 24, the gate driving panel circuit GPC disposed in the gate driving panel circuit area GPCA may include, e.g., a first gate driving panel circuit GPC #1 and a second gate driving panel circuit GPC #2. Each of the first gate driving panel circuit GPC #1 and the second gate driving panel circuit GPC #2 may have a separate Q node and a separate QB node.

The first gate driving panel circuit GPC #1 may include a first output buffer block BUF #1, a first logic block LOGIC #1, and a first real-time sensing control block RT #1.

The first output buffer block BUF #1 may be configured to output the first scan signal SC1 and the first sensing signal SE1 respectively to the first scan signal line SCL1 and the first sensing signal line SENL1 connected to the first subpixel SP. For example, the first scan signal SC1 may be an n-th scan signal SC(n), and the first sensing signal SE1 may be an n-th sensing signal SE(n).

The first logic block LOGIC #1 may be configured to control the operation of the first output buffer block BUF #1 by controlling the voltage of each of the Q node and the QB node of the first output buffer block BUF #1.

The second gate driving panel circuit GPC #2 may include only the second output buffer block BUF #2 and the second logic block LOGIC #2.

The second output buffer block BUF #2 may be configured to output the second scan signal SC2 and the second sensing signal SE2 respectively to the second scan signal line SCL2 and the second sensing signal line SENL2 connected to the second subpixel SP. For example, the second scan signal SC2 may be an (n+1)th scan signal SC(n+1), and the second sensing signal SE2 may be an (n+1)th sensing signal SE(n+1).

The second logic block LOGIC #2 may be configured to control the operation of the second output buffer block BUF #2 by controlling the voltage of each of the Q node and the QB node of the second output buffer block BUF #2.

The first real-time sensing control block RT #1 may be shared by the first gate driving panel circuit GPC #1 and the second gate driving panel circuit GPC #2. Accordingly, the size of the gate bezel area GBA may be significantly reduced.

The first real-time sensing control block RT #1 may be configured to control the voltage of each of the Q node and the QB node of the first gate driving panel circuit GPC #1 during a first real-time sensing driving period (first blank period) to control the operation of the first output buffer block BUF #1 such that the first output buffer block BUF #1 outputs the first scan signal SC1 and the first sensing signal SE1 for sensing driving to the first subpixel SP where real-time sensing driving is to be performed.

The first real-time sensing control block RT #1 may be configured to control the voltage of each of the Q node and the QB node of the second gate driving panel circuit GPC #2 during a second real-time sensing driving period (second blank period) different from the first real-time sensing driving period (first blank period) to control the operation of the second output buffer block BUF #2 such that the second output buffer block BUF #2 outputs the second scan signal SC2 and the second sensing signal SE2 for sensing driving to the second subpixel SP where real-time sensing driving is to be performed.

At least one specific node of the first logic block LOGIC #1 and at least one specific node of the second logic block LOGIC #2 may be electrically connected to each other.

As shown in FIG. 24, among the first output buffer block BUF #1, the first logic block LOGIC #1, and the first real-time sensing control block RT #1, the first real-time sensing control block RT #1 may be positioned farthest from the display area DA.

As illustrated in FIG. 24, the gate driving panel circuit area GPCA may be disposed between the first power line area PLA1 and the second power line area PLA2.

Accordingly, at least one gate high-potential voltage line disposed in the first power line area PLA1 and at least one gate low-potential voltage line disposed in the second power line area PLA2 may be separated by the gate driving panel circuit GPC disposed in the gate driving panel circuit area GPCA.

According to the above-described example power supply arrangement, at least one high-potential voltage line and at least one low-potential voltage line do not overlap each other. Thus, the high-potential voltages GVDD (see, e.g., FIG. 25) and the low-potential voltages may be stabilized.

Figure 25:
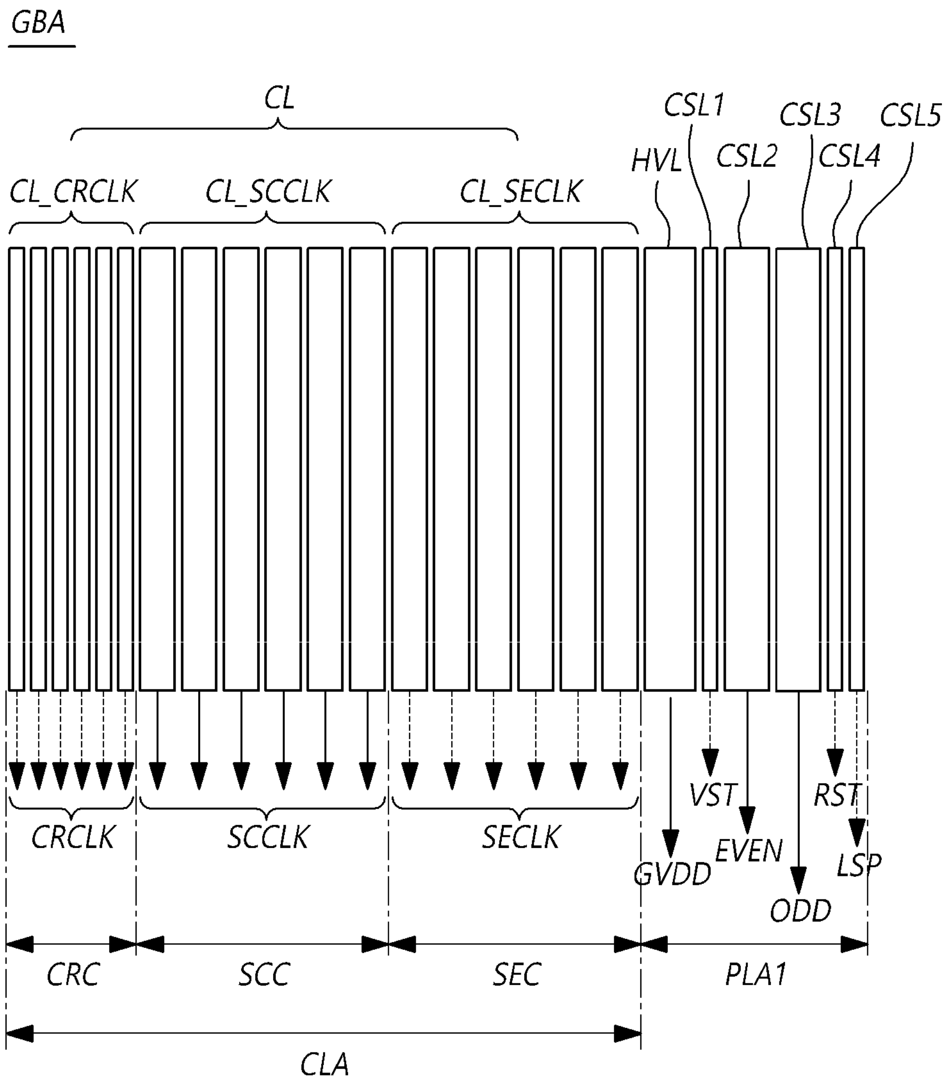
FIG. 25 is a view illustrating a line arrangement in a clock signal line area and a power line area included in a gate bezel area in a non-display area of a display panel of a display device according to example embodiments of the disclosure.

FIG. 25 is a view illustrating a line arrangement in a clock signal line area CLA and a first power line area PLA1 included in a gate bezel area GBA in a non-display area NDA of a display panel 110 according to example embodiments of the present disclosure.

As shown in FIG. 25, the gate bezel area GBA of the display panel 110 may include a clock signal line area CLA and a first power line area PLA1. The clock signal line area CLA and the first power line area PLA1 may be positioned at one side of the gate driving panel circuit area GPCA.

As illustrated in FIG. 25, the plurality of clock signal lines CL disposed in the clock signal line area CLA may include a carry clock signal line area CRC, a scan clock signal line area SCC, and a sensing clock signal line area SEC.

The carry clock signal lines CL_CRCLK for transferring the carry clock signals CRCCLK to the gate driving panel circuit GPC may be disposed in the carry clock signal line area CRC.

In the scan clock signal line area SCC, the scan clock signal lines CL_SCCLK for transferring the scan clock signals SCCLK to the gate driving panel circuit GPC may be disposed.

The sensing clock signal lines CL_SECLK for transferring the sensing clock signals SECLK to the gate driving panel circuit GPC may be disposed in the sensing clock signal line area SEC.

Among the carry clock signal line area CRC, the scan clock signal line area SCC, and the sensing clock signal line area SEC, the scan clock signal line area SCC may be positioned between the carry clock signal line area CRC and the sensing clock signal line area SEC, the carry clock signal line area CRC may be positioned farthest from the display area DA, and the sensing clock signal line area SEC may be positioned closest to the display area DA.

Among the carry clock signal line area CRC, the scan clock signal line area SCC, and the sensing clock signal line area SEC, the carry clock signal line area CRC may be positioned farthest from the gate driving panel circuit area GPCA, and the sensing clock signal line area SEC may be positioned closest to the gate driving panel circuit area GPCA.

As shown in FIG. 25, the width of one scan clock signal line CL_SCCLK may be larger than the width of one carry clock signal line CL_CRCLK. The width of one sensing clock signal line CL_SECLK may be larger than the width of one carry clock signal line CL_CRCLK.

As illustrated in FIG. 25, in the first power line area PLA1, at least one gate high-potential voltage line HVL for transferring at least one gate high-potential voltage GVDD to the gate driving panel circuit GPC may be disposed.

As shown in FIG. 25, at least one control signal line may be additionally disposed in the first power line area PLA1. For example, the at least one control signal line may include at least one of a start signal line CSL1 for transferring a start signal VST for indicating the start of the gate driving operation to the gate driving panel circuit GPC, a first driving order control signal line CSL2 for transferring an even-numbered driving control signal EVEN to the gate driving panel circuit GPC, a second driving order control signal line CSL3 for transferring an odd-numbered driving control signal ODD to the gate driving panel circuit GPC, a reset signal line CSL4 for transferring a reset signal RST for indicating the end of the gate driving operation to the gate driving panel circuit GPC, and a line selection signal line CSL5 for transferring a line selection signal LSP to the gate driving panel circuit GPC.

The gate high-potential voltage line HVL may have a larger width than the start signal line CSL1, the reset signal line CSL4, and the line selection signal line CSL5.

The first driving order control signal line CSL2 and the second driving order control signal line CSL3 may be disposed in two specific line areas within the first power line area PLA1, but the present disclosure is not so limited. As an example of changing the line arrangement, the first driving order control signal line CSL2 and the second driving order control signal line CSL3 may not be disposed in two specific line areas in the first power line area PLA1, but instead two gate high-potential voltage lines may be disposed in two specific areas.

Figure 26:
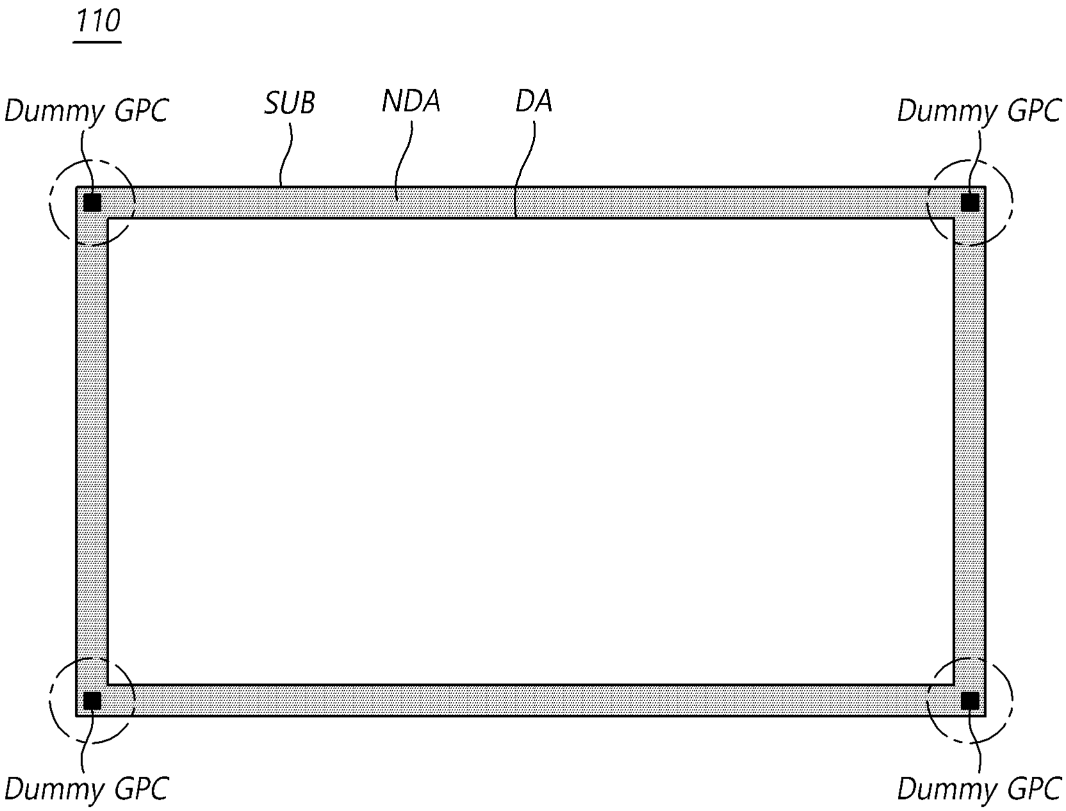
FIG. 26 is a plan view of a display panel according to example embodiments of the disclosure in which a dummy gate driving panel circuit is formed at a corner point.

FIG. 26 is a plan view of a display panel 110 according to example embodiments of the present disclosure and is a plan view of an example display panel 110 in which a dummy gate driving panel circuit Dummy GPC is formed at a corner point.

As shown in FIG. 26, the display panel 110 according to example embodiments of the disclosure may include a dummy gate driving panel circuit Dummy GPC disposed at all or some of a plurality of corner points of the non-display area NDA.

The dummy gate driving panel circuit Dummy GPC has basically the same structure as the gate driving panel circuit GPC. However, the dummy gate driving panel circuit Dummy GPC is not connected to the gate line GL actually used for display driving. Here, each gate line GL may be a scan signal line SCL or a sensing signal line SENL (see, e.g., FIG. 2).

Figure 27:
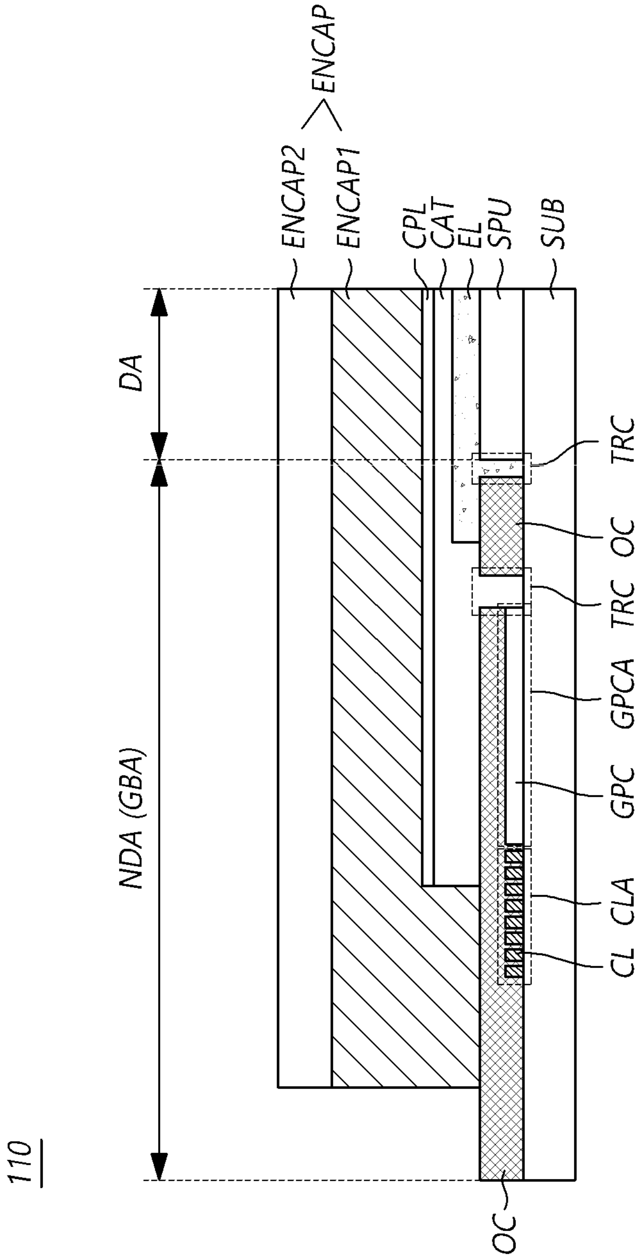
FIG. 27 is a cross-sectional view of an area including a gate bezel area and a portion of a display area of a display panel according to example embodiments of the disclosure.

FIG. 27 is a cross-sectional view of a display panel 110 according to example embodiments of the present disclosure, and is an example cross-sectional view of an area including a gate bezel area GBA and a portion of a display area DA.

The cross-sectional view illustrated in FIG. 27 is an example cross-sectional view of an area including the gate bezel area GBA where the gate driving panel circuit GPC is disposed in the non-display area NDA of the display panel 110 and a portion of the display area DA near the gate bezel area GBA.

As illustrated in FIG. 27, the display panel 110 according to example embodiments of the disclosure may include a substrate SUB, a gate driving panel circuit GPC, a plurality of clock signal lines CL, an overcoat layer OC, a cathode electrode CAT, and the like.

The substrate SUB may be divided into a display area DA and a non-display area NDA.

The gate driving panel circuit GPC may be disposed on the substrate SUB, may be disposed in the gate driving panel circuit area GPCA included in the gate bezel area GBA of the non-display area NDA, and may be configured to output a gate signal to each of the plurality of gate lines GL (not shown) disposed in the display area DA.

For example, the plurality of gate lines GL may include a plurality of scan signal lines SCL and a plurality of sensing signal lines SENL.

The plurality of clock signal lines CL may be disposed on the substrate SUB and may be disposed in the clock signal line area CLA positioned at one side of the gate driving panel circuit area GPCA in the non-display area NDA. Each of the plurality of clock signal lines CL may supply a corresponding clock signal to the gate driving panel circuit GPC.

For example, the clock signal line area CLA may be disposed further away from the display area DA than the gate driving panel circuit area GPCA is.

For example, the plurality of clock signal lines CL may include a plurality of carry clock signal lines CL_CRCLK, a plurality of scan clock signal lines CL_SCCLK, and a plurality of sensing clock signal lines CL_SECLK (see, e.g., FIG. 25).

The overcoat layer OC may be disposed on the plurality of clock signal lines CL.

The overcoat layer OC may be disposed on the gate driving panel circuit GPC.

The cathode electrode CAT may be disposed in the display area DA and may extend to the non-display area NDA.

The cathode electrode CAT may extend to the gate bezel area GBA in the non-display area NDA and may extend to an upper portion of the whole or part of the gate driving panel circuit GPC. Accordingly, the cathode electrode CAT may overlap the whole or part of the gate driving panel circuit GPC.

The cathode electrode CAT may extend to the gate bezel area GBA in the non-display area NDA and may extend to an upper portion of the whole or part of the plurality of clock signal lines CL. Accordingly, the cathode electrode CAT may overlap the whole or part of the plurality of clock signal lines CL.

The first power line area PLA1 may be disposed between the clock signal line area CLA and the gate driving panel circuit area GPCA, and the second power line area PLA2 may be disposed between the gate driving panel circuit area GPCA and the display area DA. However, in FIG. 27, the first power line area PLA1 and the second power line area PLA2 are not illustrated.

As shown in FIG. 27, the light emitting layer EL positioned under the cathode electrode CAT may be disposed in the display area DA and may extend to a portion of the non-display area NDA. The light emitting layer EL may overlap a portion of the overcoat layer OC.

A subpixel unit SPU may be positioned under the light emitting layer EL. The subpixel unit SPU may include an anode electrode AE, transistors (e.g., DRT, SCT, or SENT), and a storage capacitor Cst.

As illustrated in FIG. 27, in the non-display area NDA, there may be a hole in the overcoat layer OC or a trench TRC corresponding to an area where the overcoat layer OC has been removed. For example, where there are a plurality of trenches TRC, one of the plurality of trenches TRC may not overlap the light emitting layer EL, and another trench may overlap the light emitting layer EL. The light emitting layer EL may extend to the non-display area NDA and be disposed inside one of the trenches TRC in the overcoat layer OC.

As shown in FIG. 27, the display panel 110 according to example embodiments of the present disclosure may include a capping layer CPL on the cathode electrode CAT and an encapsulation layer ENCAP on the capping layer CPL.

The encapsulation layer ENCAP may include a first encapsulation layer ENCAP1 and a second encapsulation layer ENCAP2. For example, the first encapsulation layer ENCAP1 may include an adhesive and/or a desiccant having an encapsulation function. The first encapsulation layer ENCAP1 may include an organic material. The second encapsulation layer ENCAP2 may include a metal or an inorganic material. The second encapsulation layer ENCAP2 may be disposed to cover the cathode electrode CAT, the capping layer CPL, and the first encapsulation layer ENCAP1.

The encapsulation layer ENCAP may overlap the plurality of clock signal lines CL and the gate driving panel circuit GPC.

When manufacturing the display panel 110, each of the light emitting layer EL, the cathode electrode CAT, and the capping layer CPL may have a slightly different size or edge position depending on a process error. For example, the cathode electrode CAT may overlap none of the plurality of clock signal lines CL disposed in the clock signal line area CLA. Depending on a process error, a portion of the cathode electrode CAT may overlap the whole or part of the plurality of clock signal lines CL disposed in the clock signal line area CLA.

Figure 28:
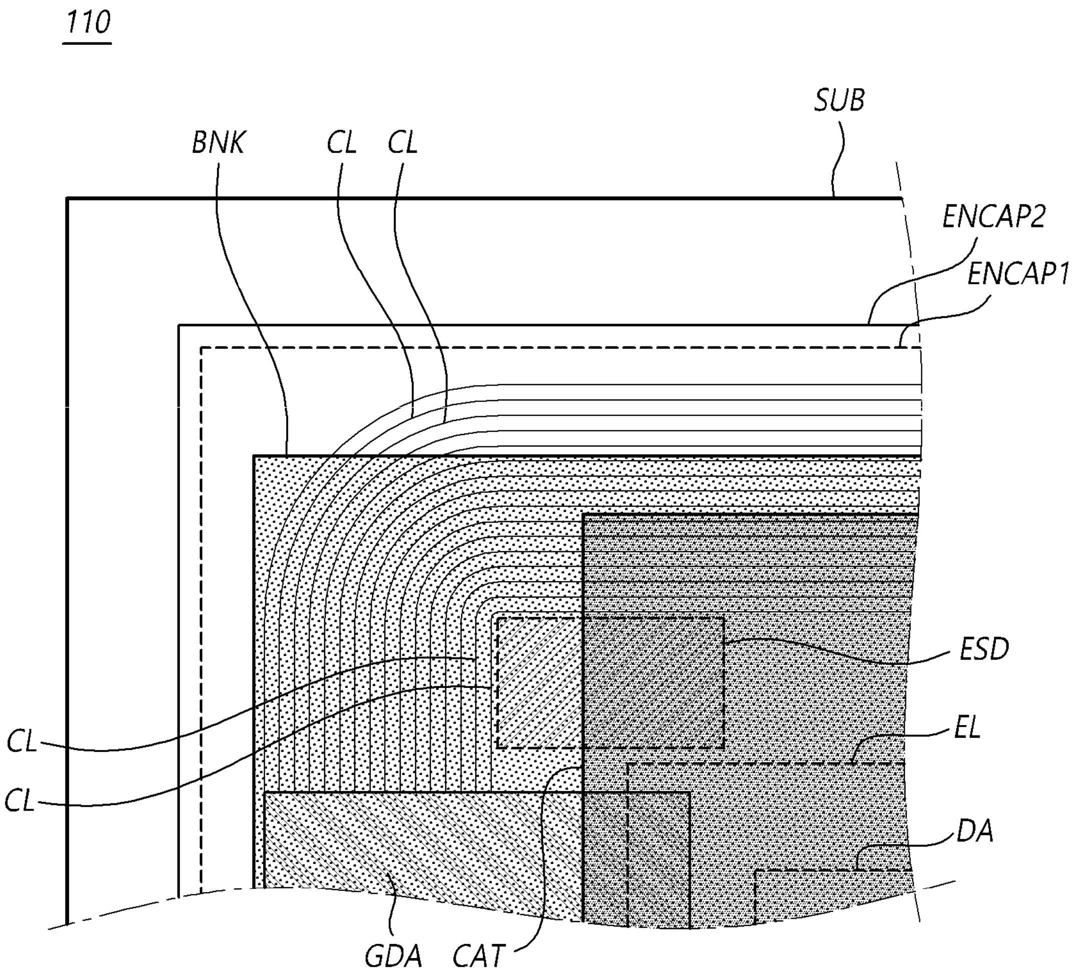
FIG. 28 is a plan view of an outer corner area of a substrate of a display panel according to example embodiments of the disclosure.

FIG. 28 is a plan view of an outer corner area of a substrate SUB of a display panel 110 according to example embodiments of the present disclosure.

As shown in FIG. 28, the display panel 110 according to example embodiments of the disclosure may include a bank BNK extending from the display area DA to the non-display area NDA, a light emitting layer EL extending from the display area DA to the non-display area NDA, a cathode electrode CAT extending from the display area DA to the non-display area NDA and positioned on the light emitting layer EL, and an electrostatic discharge unit ESD disposed in an outer corner area of the non-display area NDA.

As illustrated in FIG. 28, a corner portion of the bank BNK, a corner portion of the cathode electrode CAT, a corner portion of the first encapsulation layer ENCAP1, and a corner portion of the second encapsulation layer ENCAP2 may be present in an outer corner area of the substrate SUB of the display panel 110.

As shown in FIG. 28, in the outer corner area of the display panel 110, among the bank BNK, the cathode electrode CAT, the first encapsulation layer ENCAP1, and the second encapsulation layer ENCAP2, the bank BNK may extend further outward than the cathode electrode CAT, and the first encapsulation layer ENCAP1 and the second encapsulation layer ENCAP2 may extend further outward than the bank BNK. The second encapsulation layer ENCAP2 may extend to a position similar to that of the first encapsulation layer ENCAP1 or may extend further outward than the first encapsulation layer ENCAP1.

As illustrated in FIG. 28, a portion of the gate driving area GDA may be disposed in an outer corner area of the substrate SUB of the display panel 110.

As shown in FIG. 28, the gate driving area GDA may include a gate driving panel circuit area GPCA in which the gate driving panel circuit GPC is disposed. The gate driving area GDA may further include a clock signal line area CLA, a first power line area PLA1, and a second power line area PLA2.

As illustrated in FIG. 28, the gate driving area GDA may overlap the bank BNK, the first encapsulation layer ENCAP1, and the second encapsulation layer ENCAP2. The whole or part of the gate driving area GDA may overlap the cathode electrode CAT.

As shown in FIG. 28, an electrostatic discharge unit ESD may be disposed in an outer corner area of the substrate SUB of the display panel 110. For example, the electrostatic discharge unit ESD may include an electrostatic discharge circuit or an electrostatic discharge pattern.

The electrostatic discharge unit ESD may not be disposed only in the outer corner area of the substrate SUB, but may be disposed at various other positions to provide an electrostatic discharge function.

As shown in FIG. 28, the electrostatic discharge unit ESD may overlap the bank BNK. The whole or part of the electrostatic discharge unit ESD may overlap the cathode electrode CAT. The electrostatic discharge unit ESD may overlap each of the first encapsulation layer ENCAP1 and the second encapsulation layer ENCAP2.

For example, the bank BNK may be disposed above the entire electrostatic discharge unit ESD. The cathode electrode CAT may be disposed above a portion of the electrostatic discharge unit ESD.

As illustrated in FIG. 28, a plurality of clock signal lines CL may be disposed along edges of outer corners of the substrate SUB.

As shown in FIG. 28, the plurality of clock signal lines CL may overlap the bank BNK, the first encapsulation layer ENCAP1, and the second encapsulation layer ENCAP2. All or some of the plurality of clock signal lines CL may partially overlap the cathode electrode CAT. All or some of the plurality of clock signal lines CL may not overlap the electrostatic discharge unit ESD.

As shown in FIG. 28, the light emitting layer EL may be disposed to extend from the display area DA to the non-display area NDA. For example, the light emitting layer EL may be one of components for configuring one of an organic light emitting diode (OLED), a quantum dot organic light emitting diode (QD-OLED), and a light emitting diode (LED) chip.

As illustrated in FIG. 28, a portion of the gate driving area GDA may overlap the light emitting layer EL. The electrostatic discharge unit ESD is illustrated as not overlapping the light emitting layer EL, but the present disclosure is not so limited. In some cases, the electrostatic discharge unit ESD may overlap the whole or part of the light emitting layer EL.

Embodiments of the disclosure described above are briefly described below.

Embodiments of the disclosure may provide a display device comprising a display panel having a plurality of subpixels receiving a driving voltage through a driving voltage line and displaying a plurality of image frames, a controller controlling a voltage and current supplied to the display panel, and a current sensing circuit sensing an output current supplied to the display panel through the driving voltage line and supplying a sensing current corresponding to the output current to the controller, wherein the controller controls the output current by comparing the sensing current and a target current, controls the output current flowing through the driving voltage line by a first gain when a difference in magnitude between the sensing current and the target current is larger than reference data, and controls the output current flowing through the driving voltage line by a second gain when the difference in magnitude between the sensing current and the target current is the reference data or less.

The plurality of image frames may include a first image frame, a second image frame, and a third image frame. A difference between a first output current while the first image frame is displayed and a second output current while the second image frame is displayed may be the first gain.

A difference between a third output current while the third image frame is displayed and the second output current while the second image frame is displayed may be the second gain.

When the sensing current is included in a stable current range, the controller may maintain the output current. An upper limit target current which is an upper limit of the stable current range may be larger than the target current, and a lower limit target current which is a lower limit of the stable current range may be smaller than the target current.

The upper limit target current may have a value obtained by multiplying the target current by a predetermined first ratio, and the lower limit target current may have a value obtained by multiplying the target current by a predetermined second ratio.

The upper limit target current may have a value obtained by adding a predetermined offset to the target current, and the lower limit target current may have a value obtained by subtracting the offset from the target current.

The upper limit target current may be an absolute limit level which is a fixed value.

The upper limit target current may be a smaller value of a value obtained by multiplying the target current by a predetermined first ratio and a value obtained by adding a predetermined offset to the target current. The lower limit target current may be a smaller value of a value obtained by multiplying the target current by a predetermined second ratio and a value obtained by subtracting the offset from the target current.

The upper limit target current may be a smaller value of a value obtained by adding a predetermined offset to the target current and an absolute limit level which is a fixed value. The lower limit target current may have a value obtained by subtracting the offset from the target current.

The upper limit target current may be a smaller value of a value obtained by multiplying the target current by a predetermined first ratio and an absolute limit level which is a fixed value. The lower limit target current may have a value obtained by multiplying the target current by a predetermined second ratio.

The output current during at least one image frame after the sensing current is included in a stable current range may be controlled by the second gain.

An active period which is a period when each of the plurality of image frames is displayed through the display panel and a blank period which is a period different from the active period may be included in an image driving period. The current sensing circuit may sense the output current during the blank period.

The controller may receive a first sensing current from the current sensing circuit during a first blank period included in a first image driving period. The controller may determine one of the first gain or the second gain as a gain based on the first sensing current during an active period included in a second image driving period following the first image driving period. The controller may control the output current by the determined gain during an active period included in a third image driving period following the second image driving period.

The plurality of subpixels may include a light emitting element, a driving transistor electrically connected between the driving voltage line and the light emitting element, and a scan transistor controlling whether to supply a data voltage to be supplied to a gate node of the driving transistor.

The controller may control the output current by adjusting a magnitude of the data voltage.

The current sensing circuit may include a circuit unit electrically connected to the controller and a resistor unit connected in parallel to the circuit unit.

Embodiments of the disclosure may provide a method for driving a display device, comprising a current sensing step in which a current sensing circuit senses an output current supplied to a display panel through a driving voltage line and supplies a sensing current corresponding to the output current to a controller, an output current determination step in which the controller compares the sensing current and a target current, a filter determination step in which when a difference in magnitude between the sensing current and the target current is larger than reference data, the controller selects a fast filter mode to control the output current and, when the difference in magnitude between the sensing current and the target current is the reference data or less, the controller selects a slow filter mode to control the output current, and an output current change step in which when the fast filter mode is selected, the controller controls the output current flowing through the driving voltage line by a first gain and, when the slow filter mode is selected, the controller controls the output current flowing through the driving voltage line by a second gain.

The plurality of image frames displayed through the display panel may include a first image frame, a second image frame, and a third image frame. A difference between a first output current while the first image frame is displayed and a second output current while the second image frame is displayed may be the first gain.

A difference between a third output current while the third image frame is displayed and the second output current while the second image frame is displayed may be the second gain.

When the sensing current is included in a stable current range, the controller may maintain the output current. An upper target current which is an upper limit of the stable current range may be larger than the target current, and a lower target current which is a lower limit of the stable current range may be smaller than the target current.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only.

That is, the disclosed embodiments are intended to illustrate the scope of the technical idea of the disclosure.

What is claimed:

1. A display device, comprising:

a display panel having a plurality of subpixels receiving a driving voltage through a driving voltage line and displaying a plurality of image frames;

a controller controlling a voltage and current supplied to the display panel; and a current sensing circuit sensing an output current supplied to the display panel through the driving voltage line and supplying a sensing current corresponding to the output current to the controller, wherein the controller:

controls the output current by comparing the sensing current and a target current, selects a fast filter mode to control the output current when a difference in magnitude between the sensing current and the target current is greater than a reference data, selects a slow filter mode to control the output current when the difference in magnitude between the sensing current and the target current is less than or equal to the reference data, controls the output current flowing through the driving voltage line by a first gain when the fast filter mode is selected, and controls the output current flowing through the driving voltage line by a second gain when the slow filter mode is selected.

2. The display device of claim 1, wherein the plurality of image frames include a first image frame, a second image frame, and a third image frame, and wherein a difference between a first output current while the first image frame is displayed and a second output current while the second image frame is displayed is the first gain.

3. The display device of claim 2, wherein a difference between a third output current while the third image frame is displayed and the second output current while the second image frame is displayed is the second gain.

4. The display device of claim 1, wherein when the sensing current is included in a stable current range, the controller maintains the output current, and wherein an upper limit target current which is an upper limit of the stable current range is larger than the target current, and a lower limit target current which is a lower limit of the stable current range is smaller than the target current.

5. The display device of claim 4, wherein the upper limit target current has a value obtained by multiplying the target current by a predetermined first ratio, and the lower limit target current has a value obtained by multiplying the target current by a predetermined second ratio.

6. The display device of claim 4, wherein the upper limit target current has a value obtained by adding a predetermined offset to the target current, and the lower limit target current has a value obtained by subtracting the offset from the target current.

7. The display device of claim 4, wherein the upper limit target current is an absolute limit level which is a fixed value.

8. The display device of claim 4, wherein the upper limit target current is a smaller value of a value obtained by multiplying the target current by a predetermined first ratio and a value obtained by adding a predetermined offset to the target current, and wherein the lower limit target current is a smaller value of a value obtained by multiplying the target current by a predetermined second ratio and a value obtained by subtracting the offset from the target current.

9. The display device of claim 4, wherein the upper limit target current is a smaller value of a value obtained by adding a predetermined offset to the target current and an absolute limit level which is a fixed value, and wherein the lower limit target current has a value obtained by subtracting the offset from the target current.

10. The display device of claim 4, wherein the upper limit target current is a smaller value of a value obtained by multiplying the target current by a predetermined first ratio and an absolute limit level which is a fixed value, and wherein the lower limit target current has a value obtained by multiplying the target current by a predetermined second ratio.

11. The display device of claim 1, wherein the output current during at least one image frame after the sensing current is included in a stable current range is controlled by the second gain.

12. The display device of claim 1, wherein an active period which is a period when each of the plurality of image frames is displayed through the display panel and a blank period which is a period different from the active period are included in an image driving period, and wherein the current sensing circuit senses the output current during the blank period.

13. The display device of claim 12, wherein the controller receives a first sensing current from the current sensing circuit during a first blank period included in a first image driving period, wherein the controller determines one of the first gain or the second gain as a gain based on the first sensing current during an active period included in a second image driving period following the first image driving period, and wherein the controller controls the output current by the determined gain during an active period included in a third image driving period following the second image driving period.

14. The display device of claim 1, wherein the plurality of subpixels include:

a light emitting element;

a driving transistor electrically connected between the driving voltage line and the light emitting element; and a scan transistor controlling whether to supply a data voltage to be supplied to a gate node of the driving transistor.

15. The display device of claim 1, wherein the controller controls the output current by adjusting a magnitude of the data voltage.

16. The display device of claim 1, wherein the current sensing circuit includes:

a circuit unit electrically connected to the controller; and a resistor unit connected in parallel to the circuit unit.

17. A method for driving a display device, the method comprising:

a current sensing step in which a current sensing circuit senses an output current supplied to a display panel through a driving voltage line and supplies a sensing current corresponding to the output current to a controller;

an output current determination step in which the controller compares the sensing current and a target current;

a filter determination step in which when a difference in magnitude between the sensing current and the target current is larger than reference data, the controller selects a fast filter mode to control the output current and, when the difference in magnitude between the sensing current and the target current is the reference data or less, the controller selects a slow filter mode to control the output current; and an output current change step in which when the fast filter mode is selected, the controller controls the output current flowing through the driving voltage line by a first gain and, when the slow filter mode is selected, the controller controls the output current flowing through the driving voltage line by a second gain.

18. The method of claim 17, wherein a plurality of image frames displayed through the display panel include a first image frame, a second image frame, and a third image frame, and wherein a difference between a first output current while the first image frame is displayed and a second output current while the second image frame is displayed is the first gain.

19. The method of claim 18, wherein a difference between a third output current while the third image frame is displayed and the second output current while the second image frame is displayed is the second gain.

20. The method of claim 17, wherein when the sensing current is included in a stable current range, the controller maintains the output current, and wherein an upper limit target current which is an upper limit of the stable current range is larger than the target current, and a lower limit target current which is a lower limit of the stable current range is smaller than the target current.

* * * * *